(12) United States Patent
Muro et al.

(10) Patent No.: US 7,761,561 B2
(45) Date of Patent: Jul. 20, 2010

(54) SENSOR NET SERVER FOR MIGRATING OR REPLACING SENSOR NODES

(76) Inventors: Keiro Muro, c/o Hitachi, Ltd., Intellectual Property Group, 12th Floor, Marunouchi Center Building, 6-1, Marunouchi 1-chome, Chiyoda-ku, Tokyo 100-8220 (JP); Toshiyuki Odaka, c/o Hitachi, Ltd., Intellectual Property Group, 12th Floor, Marunouchi Center Building, 6-1, Marunouchi 1-chome, Chiyoda-ku, Tokyo 100-8220 (JP); Minoru Ogushi, c/o Hitachi, Ltd., Intellectual Property Group, 12th Floor, Marunouchi Center Building, 6-1, Marunouchi 1-chome, Chiyoda-ku, Tokyo 100-8220 (JP); Kei Suzuki, c/o Hitachi, Ltd., Intellectual Property Group, 12th Floor, Marunouchi Center Building, 6-1, Marunouchi 1-chome, Chiyoda-ku, Tokyo 100-8220 (JP); Shoji Suzuki, c/o Hitachi, Ltd., Intellectual Property Group, 12th Floor, Marunouchi Center Building, 6-1, Marunouchi 1-chome, Chiyoda-ku, Tokyo 100-8220 (JP); Kazuki Watanabe, c/o Hitachi, Ltd., Intellectual Property Group, 12th Floor, Marunouchi Center Building, 6-1, Marunouchi 1-chome, Chiyoda-ku, Tokyo 100-8220 (JP)

( * ) Notice: Subject to any disclaimer, the term of this patent is extended or adjusted under 35 U.S.C. 154(b) by 378 days.

(21) Appl. No.: 11/826,301

(22) Filed: Jul. 13, 2007

(65) Prior Publication Data

US 2008/0071892 A1 Mar. 20, 2008

(30) Foreign Application Priority Data

Sep. 14, 2006 (JP) .............................. 2006-249059

(51) Int. Cl.
G06F 15/173 (2006.01)
G06F 11/00 (2006.01)
(52) U.S. Cl. ..................... 709/224; 714/4; 714/E11.071
(58) Field of Classification Search ....................... None
See application file for complete search history.

(56) References Cited

U.S. PATENT DOCUMENTS

| 2006/0265483 | A1* | 11/2006 | Wang et al. | 709/223 |
| 2006/0266832 | A1* | 11/2006 | Howarth et al. | 235/451 |
| 2007/0028239 | A1* | 2/2007 | Dyck et al. | 718/1 |
| 2007/0115818 | A1* | 5/2007 | Bose | 370/230 |

FOREIGN PATENT DOCUMENTS

| JP | 2005-128843 | 10/2003 |
| JP | 2005-159562 | 11/2003 |

* cited by examiner

Primary Examiner—Wen-Tai Lin
(74) Attorney, Agent, or Firm—Hitachi America, Ltd.

(57) ABSTRACT

A sensor node may be used for another purpose for a moment and may also be replaced. By configuring, for a sensor node, a logic node which is provided with the physical node use information indicating whether or not the sensor node is in use and the logical node use information indicating whether or not the sensor node is provided as a logic node, a sensor node to be replaced may be specified based on the replacement request of the sensor node, a sensor node is selected which is configured as logic node providing the physical node use information indicating that the sensor node is not used and the logic node use information indicating that the sensor node is provided as the logic node, thus selected sensor node is identified as the replacing sensor node to achieve the replacement from the replaced sensor node to the replacing sensor node.

8 Claims, 28 Drawing Sheets

FIG. 7

| Label | LID | 1 | ~1131 |
|---|---|---|---|
| | name | WAREHOUSE | ~1132 |
| | Schema | TempNode | ~1133 |
| | MAC | 1001 | ~1134 |
| | PUF | T | ~1135 |
| | PUC | 2 | ~1136 |
| | LUF | T | ~1137 |
| | INSTALLATION DATE AND TIME | 1/1 10:00 | ~1138 |
| | REMOVAL DATE AND TIME | --- | ~1139 |
| Config | OBSERVATION CYCLE | 1 HR | ~1140 |
| Observant | temperature | 26.5°C | ~1141 |
| | LQI | 240 | ~1142 |
| | batteryLeft | 2.7V | ~1143 |
| | PREVIOUS COMMUNICATION DATE AND TIME | 1/1 10:00 | ~1144 |

113
Object List

FIG. 8

| FLAG | MEANING |
|---|---|
| PUF (Physical Node Use Flag) | PHYSICAL NODE USE FLAG<br>T: SENSOR NODE IS USED BY AN APPLICATION<br>F: SENSOR NODE IS NOT USED BY AN APPLICATION |
| LUF (Logical Node Use Flag) | LOGICAL NODE USE FLAG<br>T: SENSOR NODE IS PROVIDED AS THE LOGIC NODE<br>F: SENSOR NODE IS NOT PROVIDED AS THE LOGIC NODE |

FIG. 9

| | | PUF | |
|---|---|---|---|
| | | T | F |
| LUF | T | SENSOR NODE PROVIDED AS THE LOGIC NODE EXISTS AND IS USED BY AN APPLICATION | SENSOR NODE PROVIDED AS THE LOGIC NODE EXISTS BUT IS NOT USED BY APPLICATION |
| | F | SENSOR NODE IS USED BY AN APPLICATION, BUT FOR ANOTHER PURPOSE | X |

111
History Database

112
Program Archive

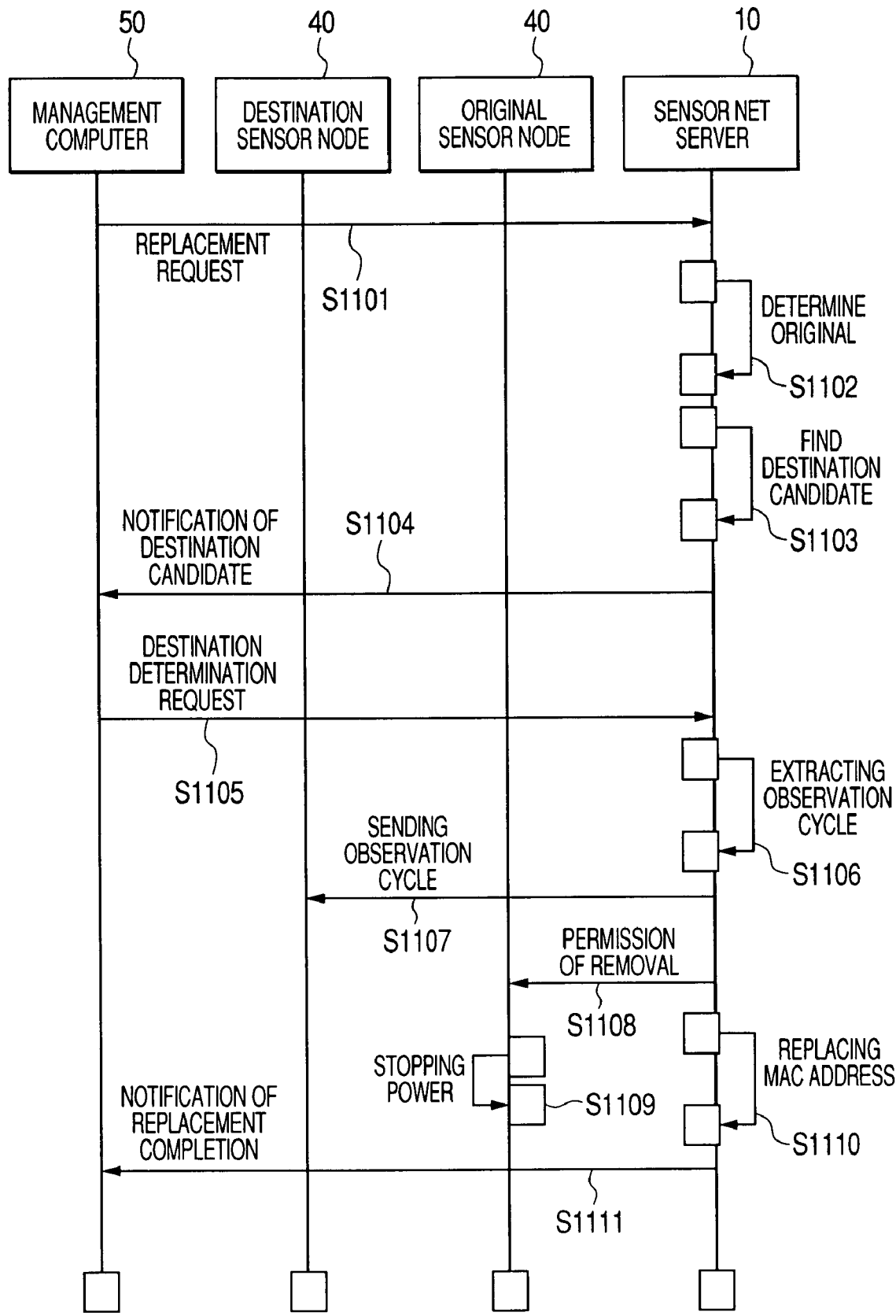

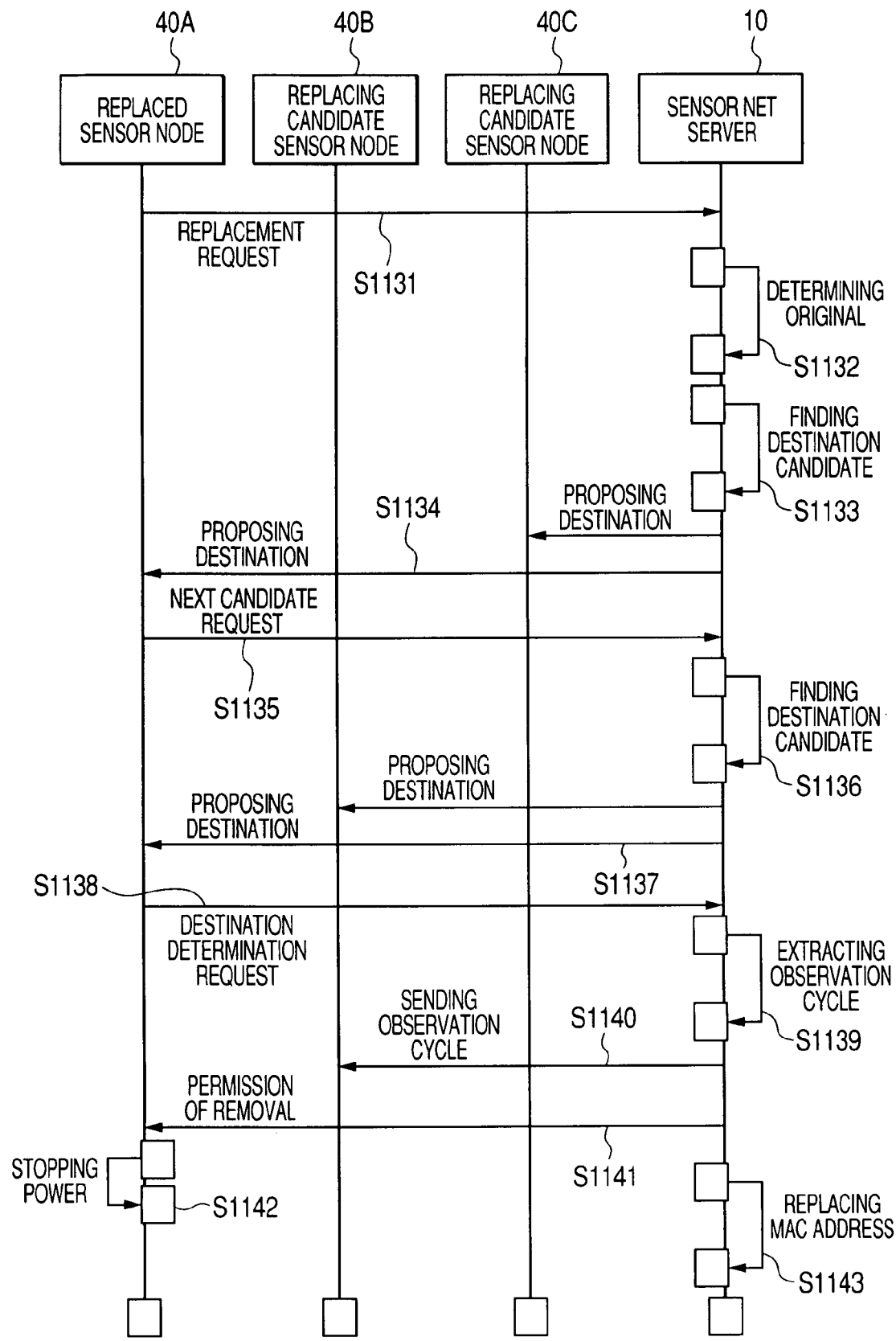

SENSOR NET SERVER FOR MIGRATING OR REPLACING SENSOR NODES

CLAIM OF PRIORITY

The present application claims priority from Japanese application JP 2006-249059 filed on Sep. 14, 2006, the content of which is hereby incorporated by reference into this application.

FIELD OF THE INVENTION

The present invention is directed to a sensor net server to be connected to a sensor node, more specifically to a technology for migrating or replacing a sensor node.

BACKGROUND OF THE INVENTION

Recently, a sensor net system have been developed which is consisted of sensor nodes and a sensor net server. In a sensor node, the status of a human being or a place (sensing data) is observed, and the observed sensing data is sent to the sensor net server. The sensor net server performs various processing based on the received sensing data.

In a sensor net system, sensor nodes are to be replaced regularly in order to calibrate sensor or to replace batteries. In addition, some sensor nodes are required to be migrated in order to temporarily measure a different environment and thus migrated sensor nodes are then required to be moved back to the original position.

With respect to the technology for replacing a terminal, JP-A No. 2005-159562 discloses a technology for replacing terminals which constitutes an IP network. The technology disclosed in JP-A No. 2005-159562, the relay device connected to a terminal stores a table indicating the correspondence between the assigned IP addresses to the terminals and the MAC addresses intrinsic to the terminals. After the replacement of a terminal, the relay device, upon reception of a request of establishing a communication link from a terminal connected thereto after the replacement, updates the table based on the IP address and MAC address included in the received request of establishing a communication link.

SUMMARY OF THE INVENTION

However, the technology disclosed in the JP-A No. 2005-159562 may not permit the terminals to be temporarily used for another purpose. Furthermore the terminal being temporarily used for another purpose is not allowed to use for the original purpose later. In addition, the disused but connected terminal may not be used for the target terminal of replacement.

The present invention has been made in view of the above circumstance and has an object to provide a sensor net system, which allows a sensor node to be temporarily used for another purpose, allows a sensor node temporarily used in another purpose to be used in the original purpose, and allows a sensor node already connected but not in use to be used as the sensor node of target of replacement.

Some of the inventions disclosed in the present application may be described briefly as follows.

The sensor net server according to an embodiment of this invention sets a logic node provided with a physical node usage information indicating whether or not the sensor node is in use and a logic node usage information indicating whether or not the sensor node is provided as a logic node, identifies the original sensor node of replacement based on the replacement request of the sensor node, selects a sensor node accompanying a logic node provided with the physical node usage information indicating that the sensor node is not in use and the logic node usage information indicating the sensor node is provided as a logic node, identifies thus selected sensor node as the target sensor node of replacement, then performs the replacement from the original replaced sensor node to the target replacing sensor node.

The sensor net server according to an embodiment of this invention specifies the original logic node of the sensor node to be migrated based on the migration request of a sensor node, then sets to the sensor node to be migrated, a migration destination logic node, which is different from the original migrated logic node, and which is provided with the physical node usage information indicating that the sensor node is in use, the logic node usage information indicating that the logic node is provided, and a configuration information of the migration destination.

According to the typical mode of the invention, a sensor node may be used temporarily for another purpose, allowing the replacement of the sensor node.

BRIEF DESCRIPTION OF THE DRAWINGS

FIG. 7 is a schematic diagram illustrating a table indicating information items to be stored in the object list of the sensor net server according to the preferred embodiment of the present invention;

FIG. 8 is a table indicating PUF and LUF according to the preferred embodiment of the present invention;

FIG. 9 is a table indicating PUF and LUF according to the preferred embodiment of the present invention;

FIG. 28 is a schematic diagram of the sequence performed in the sensor net system according to the preferred embodiment of the present invention when a sensor node is replaced;

FIG. 29 is a schematic diagram illustrating the sequence performed by the sensor net system according to the preferred embodiment of the present invention when a sensor node is replaced;

DETAILED DESCRIPTION OF THE PREFERRED EMBODIMENTS

The best mode for carrying out the invention will be described in greater details herein below with reference to the accompanying drawings.

Figure 1:
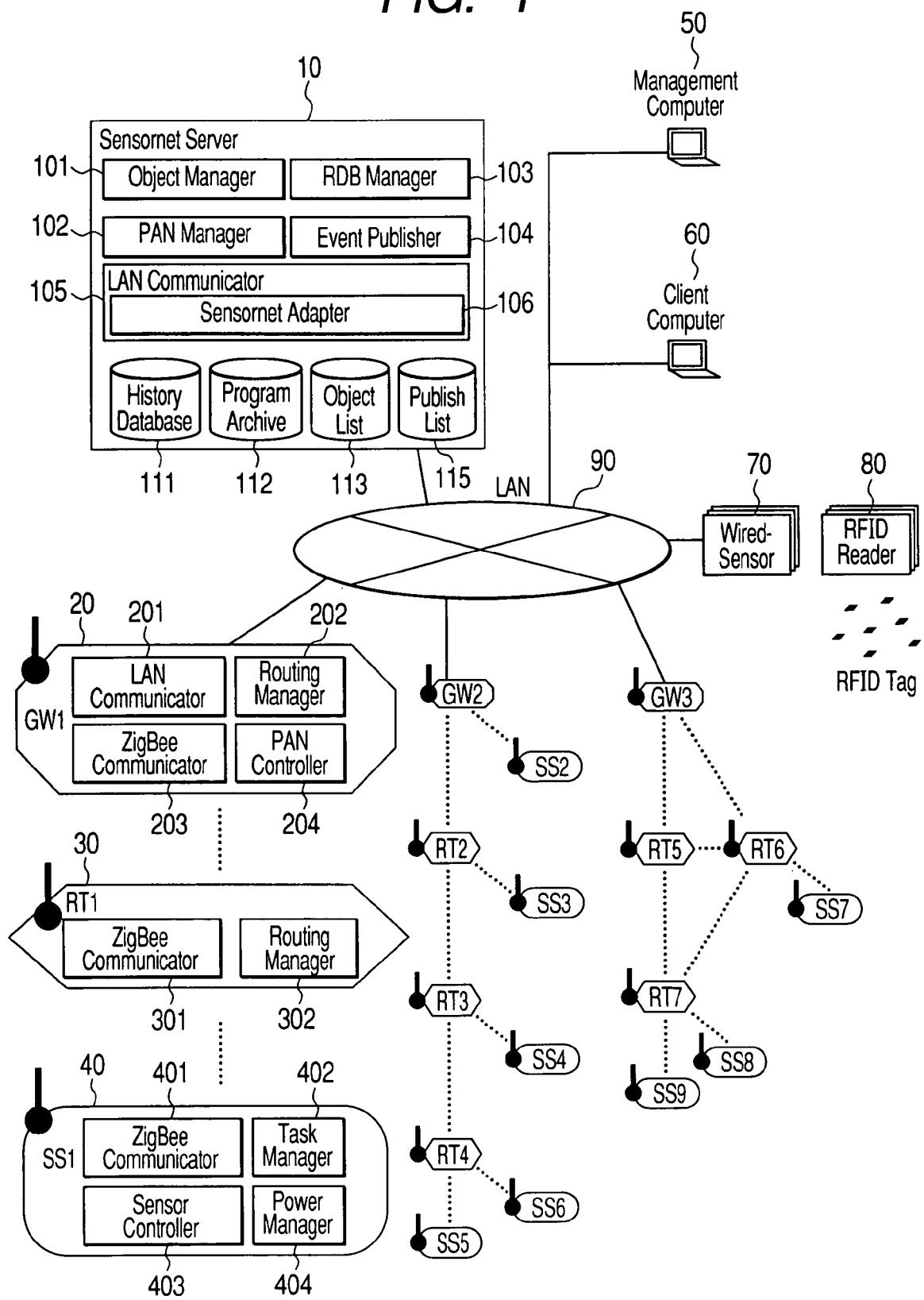
FIG. 1 is a schematic block diagram illustrating the sensor net system arrangement according to the preferred embodiment of the present invention.

FIG. 1 is a schematic block diagram of a sensor net system according to the preferred embodiment of the present invention.

The sensor net system includes a sensor net server 10, a gateway 20, a router node 30, a sensor node 40, a management computer 50, a client computer 60, a wired sensor 70, RFID reader 80, and a LAN (local area network) 90.

The LAN 90 interconnects the sensor net server 10, the gateway 20, the management computer 50, the client computer 60, and the wired sensor 70.

The sensor nodes 40 are distributed in the sensor net system. In the sensor net system shown in the drawing there are 9 sensor nodes 40, however the number of sensor nodes is optional. Each sensor node 40 has a ZigBee communication unit 401, a task manager 402, a sensor controller unit 403, and power supply management unit 404.

The ZigBee communication unit 401 uses the ZigBee protocol to communicate with the gateway 20 or the router node 30. The task manager 402 uses the request issued by the sensor net server 10 to update the information set in the sensor node 40. It should be noted here that the request is some information to demand the sensor node 40 to perform some processing. For example, the task manager 402 used the request issued from the sensor net server 10 to change the wake-up interval or the transfer mode of the sensor node 40.

The sensor controller unit 403 uses the sensor equipped in the sensor node 40 controller unit to measure the environment information. The power supply management unit 404 controls the power supply of the sensor node 40. For example, the power supply management unit 404 supplies power in the wake-up interval specified to wake up the sensor node 40.

The sensor node 40 measures the environment information by using a sensor equipped in the sensor node 40. The sensor node 40 transmits to the sensor net server 10 through a wireless network such as PAN (personal area network) the measured environment information as an observation event. The event is issued by the sensor node 40 or the sensor net server 10. The event includes the information indicating the status or change of status of the originator of the appropriate event.

In the preferred embodiment of the present invention at least one sensor node 40 is installed in for example a warehouse. Also at least one sensor node 40 is installed in a refrigerator. Each sensor node 40 has a temperature sensor. The sensor node 40 measures the temperature which is the environment information of the place of installation, and transmits the measured temperature to the sensor net server 10.

The sensor node 40 will be described in greater details with reference to FIG. 2, FIG. 3A, and FIG. 3B.

The sensor node 40 may further equip an RFID tag. In such a case the sensor net system will have an RFID reader 80. The RFID tag stores an identifier inherent to the RFID tag. The RFID reader 80 reads the inherent identifier stored in the RFID tag. The sensor node having an RFID tag will be described in greater details with reference to FIG. 4. The RFID reader 80 will be described in greater details with reference to FIG. 5.

The router node 30 has a ZigBee communication unit 301 and a routing manager 302. The ZigBee communication unit 301 uses the ZigBee protocol to communicate with the gateway 20, the sensor node 40, or another router node 30. The routing manager 302 determines the transfer destination of the information received from an external entity.

The router node 30 receives the environment information measured by the sensor node 40 or the request issued by the sensor net server 10 and transfer to the gateway 20, the sensor node 40 or another router node 30.

The gateway 20 has a LAN communication unit 201, a routing manager 202, a ZigBee communication unit 203, and PAN controller unit 204.

The LAN communication unit 201 communicates with the sensor net server 10 through the LAN 90. The routing manager 202 determines the transfer destination of the information received from an external entity. The ZigBee communication unit 203 uses the ZigBee protocol to communicate with the router node 30 or the sensor node 40. The PAN controller unit 204 controls the PAN comprised of the gateway 20.

The gateway 20 receives the environment information measured by the sensor node 40 or the request issued by the sensor net server 10 to transfer to the sensor net server 10, the gateway 20, the router node 30, or the sensor node 40.

The sensor net server 10 includes an object manager 101, a PAN manager 102, an RDB manager 103, an event issuing unit 104, a LAN communication unit 105, a history database 111, a program archive 112, an object list 113, and a publishing list 115.

The object manager 101 manages the object list 113. The object manager 101 thereby establishes one or more logical node (logic node) for one physical sensor node 40. The object manager 101 provides the sensor node 40 as one of the one or more logic node established in the sensor node 40 to the RDB manager 103 and the client computer 60. The RDB manager 103 and the client computer 60 will recognize the sensor node 40 as the logic node provided as the sensor node 40.

The object manager 101 may or may not provide all of the logic nodes established for a sensor node 40 to the RDB manager 103 and/or the client computer 60. In such a case the RDB manager 103 and/or the client computer 60 will not recognize the sensor node 40.

The PAN manager 102 controls the object manager 101 based on the event issued by the event issuing unit 104 and the request issued from the management computer 50. The PAN manager 102 thereby manages the PAN.

The RDB manager 103 reads and writes information from and to the history database 111 based on the event issued by the event issuing unit 104. More specifically, the RDB manager 103 stores the environment information measured by the sensor node 40 into the history database 111.

The event publisher unit 104 refers the publishing list 115 to publish an event. In addition, the event publishing unit 104 refers the publishing list 115 to transmit thus published event to an appropriate destination.

The LAN communication unit 105 communicates with the gateway 20, the administrative computer 50, the client computer 60, and the wired sensor 70 through the LAN 90. The LAN communication unit includes a sensor net adaptor 106. The sensor net adaptor 106 communicates with the gateway 20 through the LAN 90.

The history database 111 stores the history of the measured environment information by the sensor node 40. The information to be stored in the history database 111 will be described in greater details with reference to FIG. 10.

The program archive 112 stores a program to be distributed to the sensor node 40. The program archive 112 will be described in greater details with reference to FIG. 11.

The object list 113 stores the information on the logic nodes. The information to be stored in the object list 113 will be described in greater details with reference to FIG. 7.

The publishing list 115 indicates the condition of publishing an event and the destination of the published event.

The management computer 50 is operated by an administrator of the sensor net system. The management computer 50 is triggered by the operation by the administrator to transmit various requests to the sensor net server 10.

The client computer 60 is operated by a client of the sensor net system. The client computer 60 executes applications thereon. The client computer 60 also receives the environment information measured by the sensor node 40 from the sensor net server 10. The client computer 60 performs various processing based on thus received environment information.

The wired sensor 70 measures the environment information. The wired sensor 70 transmits thus measured environment information to the sensor net server 10 through the LAN 90.

Figure 2:
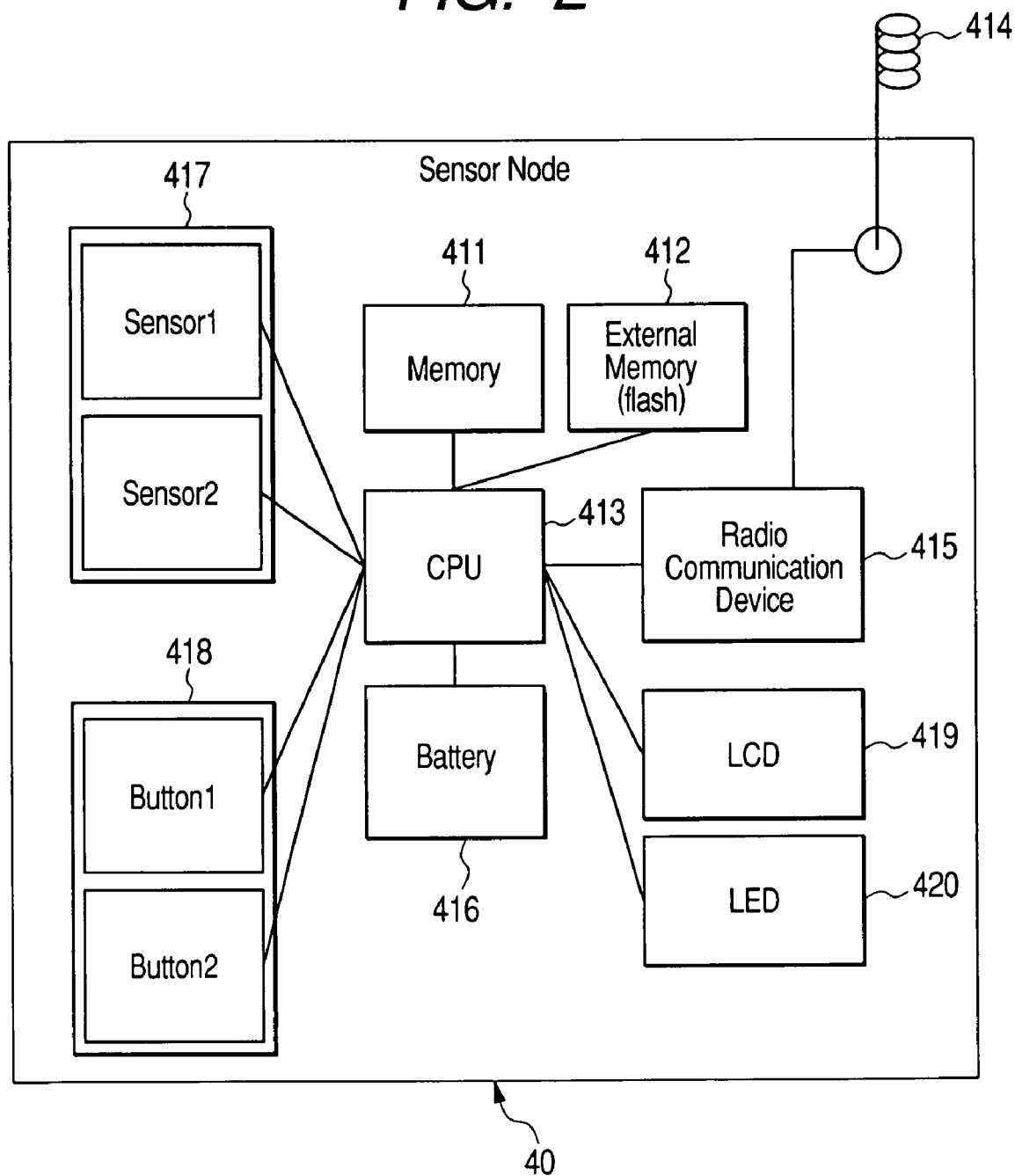
FIG. 2 is a schematic block diagram illustrating the sensor net arrangement according to the preferred embodiment of the present invention.

FIG. 2 is a schematic block diagram of a sensor node 40 according to the preferred embodiment of the present invention.

The sensor node 40 measures the environment information and issues the measured environment information as a measurement event. The sensor node 40 has a memory 411, an external storage unit 412, a CPU 413, an antenna 414, a wireless communication device 415, a battery 416, a sensor 417, a button 418, an LCD (liquid crystal display) 419, and an LED (light emitting diode) 420.

The memory 411 stores the program to be executed by the CPU 413 and the information required for the CPU 413. The external storage unit 412 is a nonvolatile storage device, which stores the programs and information. For example, the external storage unit 412 may be a flash memory device. The CPU 413 performs various processing by storing the program recorded in the external storage unit 412 into the memory 411 and executing it therefrom.

The antenna 414 transmits and receives analog signals to and from the external peer. The wireless communication device 415 converts the analog signals received via the antenna 414 into the digital signals. The wireless communication device 415 also converts the digital signals to analog signals to transmit via the antenna 414. The wireless communication device 415 thereby communicates with the sensor net server 10 on the PAN, on a wireless medium.

The sensor 417 measures the environment information. For example the sensor 417 may include a temperature sensor, a humidity sensor, a luminance sensor, a strain sensor for detecting the loosing of a bolt, a pressure sensor for detecting the open/close of a door, an infrared sensor for detecting the presence of a human being, or an infrared sensor for detecting the pulses. When the sensor node 40 is a name tag node attached to clothing, the switch detecting the input by pressing a button of a worker will be the sensor 417.

The battery 416 supplies the power to the sensor node 40. The button 418 is operated by a worker. The LCD 419 and the LED 420 outputs various information items. It may be recognized by those skilled in the art that the sensor node 40 may have either one of the LCD 419 or the LED 420.

The components constituting the sensor node 40 are put in sleep mode. The CPU 413 is waked up at a predetermined interval predefined (measurement interval).

The configuration of the router node 30 and the gateway 20 is the same as the sensor node 40. The description of the configuration of the router node 30 and the gateway 20 will be omitted.

Figure 3A:
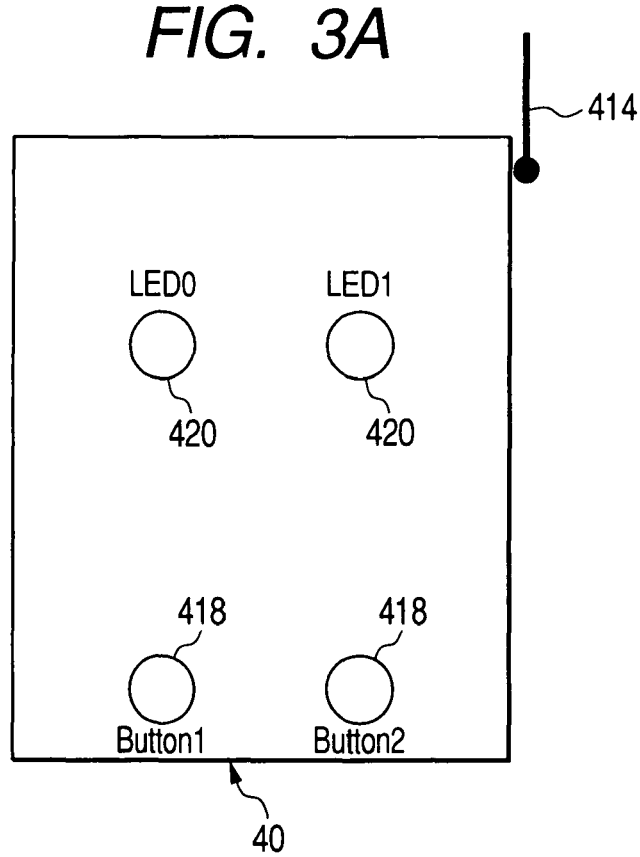
FIG. 3A is a schematic diagram illustrating first appearance of the sensor node according to the preferred embodiment of the present invention.

FIG. 3A is a first top plan view of the sensor node 40 according to the preferred embodiment of the present invention.

The sensor node 40 shown in this figure does not have a LCD 419. On the surface of the housing of the sensor node 40 shown in this figure there are two LEDs 420 and two buttons 418. On one side of the housing of the sensor node 40 shown in this figure there is an antenna 414. Any other components are placed within the housing of the sensor node 40.

The worker watches the on and off of two LEDs 420 to understand the status of the sensor node 40. The worker operates two buttons 418 to input information or request to the sensor node 40.

Figure 3B:
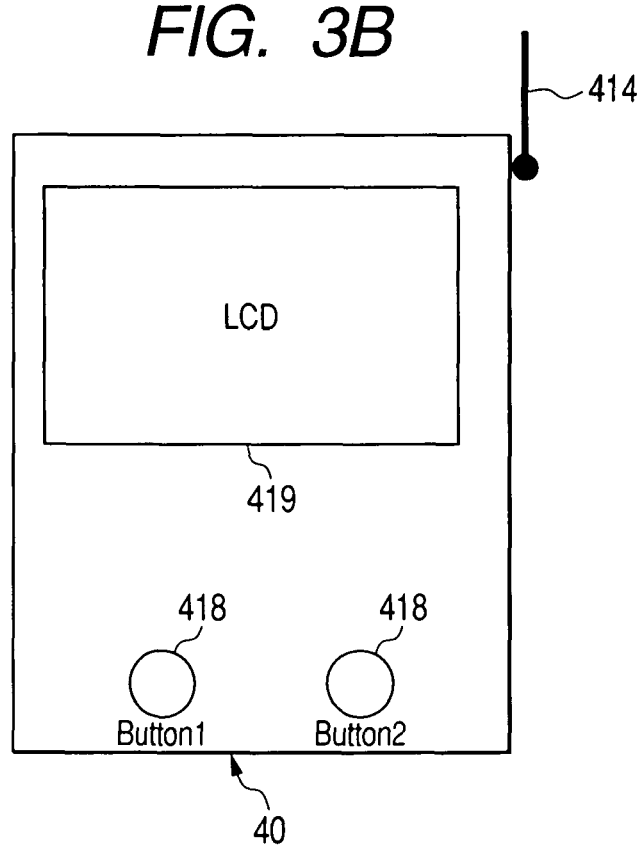
FIG. 3B is a schematic diagram illustrating second appearance of the sensor node according to the preferred embodiment of the present invention.

FIG. 3B is a second top plan view of the sensor node 40 according to the preferred embodiment of the present invention.

The sensor node 40 shown in this figure does not have a LED 420. On the top surface of the housing of the sensor node 40 there are a LCD 419 and two buttons 418. On one side of the housing of the sensor node 40 shown in this figure there is an antenna 414. Any other components are placed within the housing of the sensor node 40.

The worker refers the information displayed on the LCD 419 to understand the status of the sensor node 40. The worker operates two buttons 418 to input information or request to the sensor node 40.

Figure 4:
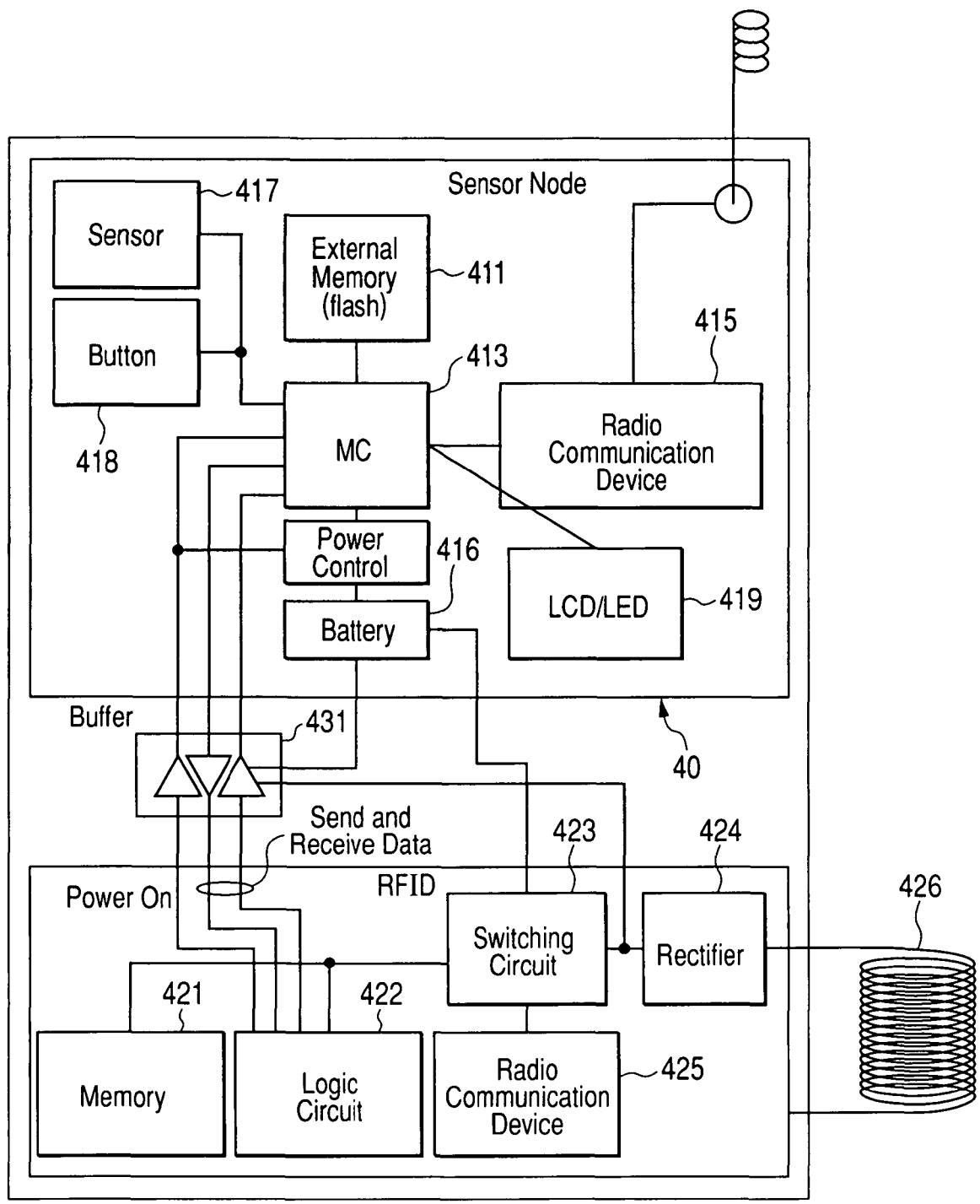
FIG. 4 is a schematic block diagram illustrating the arrangement of a sensor node with RFID tag according to the preferred embodiment of the present invention.

FIG. 4 is a schematic block diagram of a sensor node with RFID tag according to the preferred embodiment of the present invention.

The sensor node with RFID tag incorporates an RFID tag, a buffer 431, and a sensor node 40. The configuration of the sensor node 40 has been described with reference to FIG. 2 so that the detailed description thereof will be omitted.

The buffer 431 temporarily stores the information transmitted from the sensor node 40 and the information transmitted from the RFID tag. The sensor node 40 and the RFID tag mutually transmit and receive the information and request through the buffer 431.

The RFID tag has a memory 421, a logic circuit 422, a switching circuit 423, a rectifier circuit 424, radio communication device 425, and an antenna 426.

The memory 421 stores the inherent identifier of the RFID tag and the information used for the wireless communication. The logic circuit 422 transmits and receives data to and from the buffer 431. The switching circuit 423 switches the connection of the radio communication device 425 to either the memory 421 or to the logic circuit 422. The rectifier circuit 424 is placed between the switching circuit 423 and the antenna 426 to eliminate noises in the analog signals.

The antenna 426 transmits and receives analog signals to and from an external entity. The radio communication device 425 converts analog signals received through the antenna 426 to digital signals. The radio communication device 425 also converts digital signals to analog signals to transmit through the antenna 426. The radio communication device 425 thereby communicates with the RFID reader 80.

More specifically, the radio communication device 425, upon reception of a transmission request of an identifier from the RFID reader 80, reads the identifier stored in the memory 421. The radio communication device 425 then transmits thus read identifier through the antenna 426.

The radio communication device 425, upon reception of a predetermined request or predetermined information from the RFID reader 80, transmits thus received request or information to the logic circuit 422. Then logic circuit 422 then stores the received request or information into the buffer 431. The predetermined request or information transmitted from the RFID reader 80 will be reached to the sensor node 40 in this manner.

Figure 5:
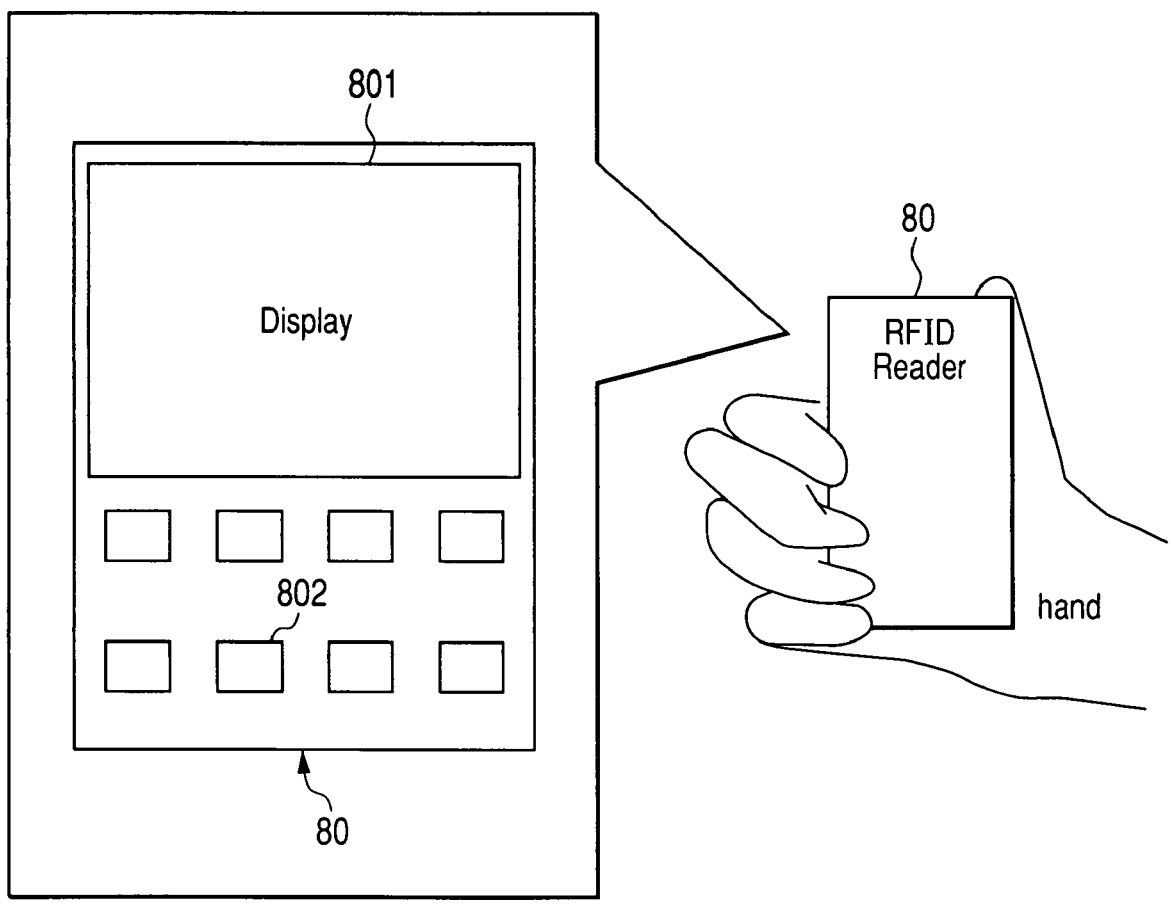
FIG. 5 is a schematic diagram illustrating an RFID reader according to the preferred embodiment of the present invention.

FIG. 5 is a schematic diagram of an RFID reader 80 according to the preferred embodiment of the present invention.

The RFID reader 80 has a CPU, a memory, and an interface. On the surface of the RFID reader 80 there are a display unit 801 and buttons 802. Various information items are output to the display unit 801. The buttons 802 are operated by the worker. More specifically, the worker operates the buttons 802 to input various information items or a request to the RFID reader 80.

The RFID reader 80 is triggered by the operation of the buttons 802 by the worker to obtain the inherent identifier of the RFID from the sensor node with RFID tag. The RFID reader 80 is also triggered by the operation of the buttons 802 by the worker to transmit various information and requests to the sensor node with RFID tag. The worker is capable of inputting information and request to the sensor node with RFID tag without operating the buttons 418 equipped in the sensor node with RFID tag.

Figure 6:
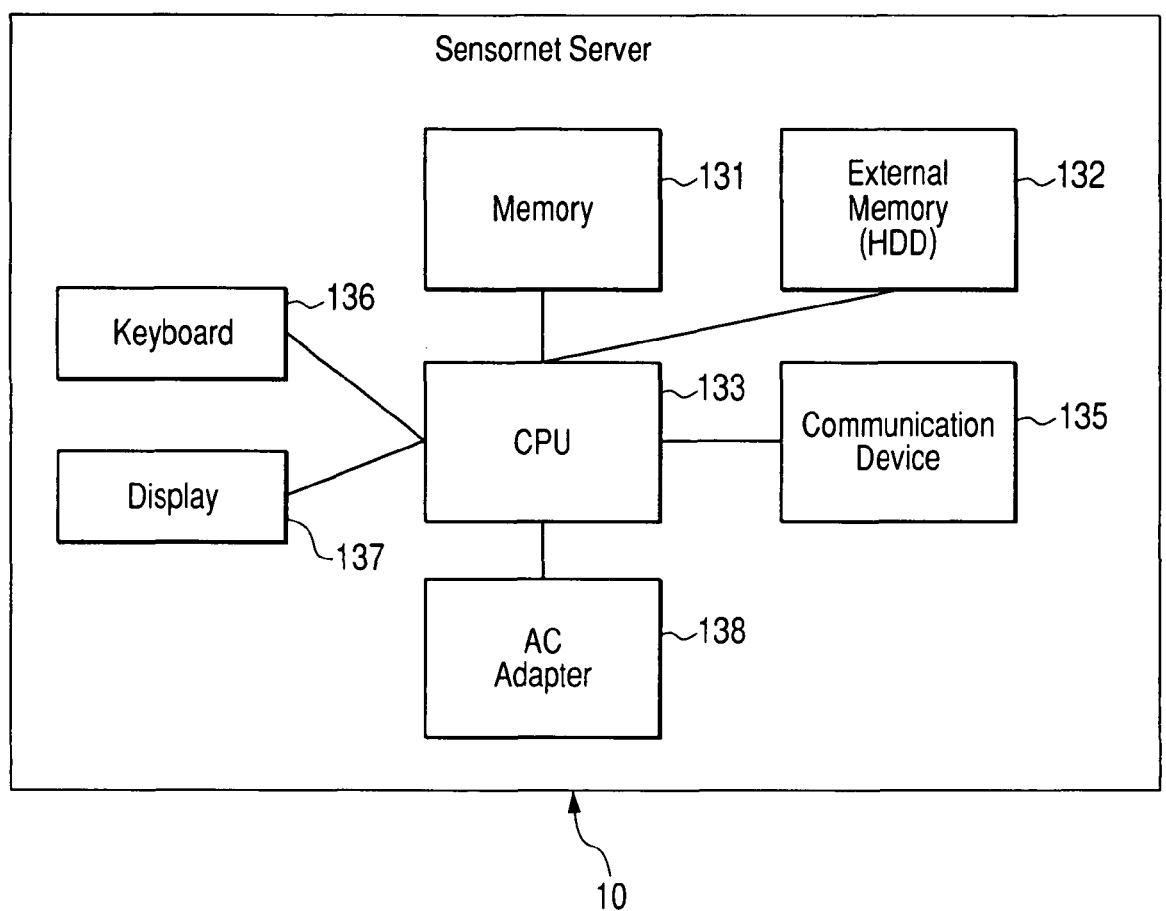
FIG. 6 is a schematic block diagram illustrating the sensor net server arrangement according to the preferred embodiment of the present invention.

FIG. 6 is a schematic block diagram of a sensor net server 10 according to the preferred embodiment of the present invention.

The sensor net server 10 includes a memory 131, an external storage device 132, a CPU 133, a communication device 134, a keyboard 136, a display 137, and an AC adaptor 138.

The memory 131 stores the program to be executed by the CPU 133 and the information required by the CPU 133. The external storage device 132 which is a nonvolatile storage device stores the programs and information. For example, the external storage device 132 may be a hard disk drive (HDD). More specifically, the external storage device 132 stores a history database 111, program archive 112, object list 113, and a publishing list 115.

The CPU 133 performs various processing by storing the program recorded in the external storage device 132 into the memory 131 then executing it. More specifically, the CPU 133 executes a program to achieve the object manager 101, the PAN manager 102, the RDB manager 103, the event publisher unit 104, and the LAN communication unit 105.

The communication device 135 communicates with the gateway 20, the management computer 50, the client computer 60, and the wired sensor 70 through the LAN 90.

The keyboard 136 is used for input information by an administrator. The keyboard 136 transmits information input from the administrator to the CPU 133. The sensor net server 10 may also have another input device instead of a keyboard 136. The display 137 displays the information received from the CPU 133.

FIG. 7 is a table indicating information items to be stored in the object list 113 of the sensor net server 10 according to the preferred embodiment of the present invention.

In the object list 113 the information on the logic nodes is stored for each logic node. This figure shows information on a logic node identified by the logic node ID (LID) "1".

A logic node is a virtual node to be created in correspondence with the sensor node connected to the sensor net server.

The information items to be stored inn the object list 113, namely the information items on the logic node, includes the label information item "label", configuration information item "config", and observation information item "observant"

The label information is the information item on the configuration of the logic node. The label information includes an LID 1131, a logic node name 1132, a scheme 1133, an MAC address 1134, a physical node use flag (PUF) 1135, a physical node use count (PUC) 1136, a logic node use flag (LUF) 1137, installation date and time 1138, and removal date and time 1139.

The LID 1131 is a unique identifier of a logic node corresponding to the appropriate information. The LID 1131 indicates for which use the sensor node is used, more specifically by which application the sensor node is used. For example, LID "1" is a sensor node for observing the temperature in a warehouse, LID "2" is a sensor node for observing the temperature in a refrigerator, etc., LID is an identifier for identifying a sensor node by application, and the LID is not an identifier for identifying physically a sensor node. This results in a plurality of LIDs set for one single sensor node when displacing the sensor node. The logic node name 1132 is the name of a sensor node identified by the LID 1131 of the information. The administrator uses the logic node name 1132 to identify the logic nodes. The scheme 1133 is the type of logic node identified by the LID 1131 of the information.

The MAC address 1134 is the MAC address of the sensor node 40 having set a logic node identified by the LID 1131 of the information.

The PUF 1135 is the physical node use information indicating whether or not the sensor node 40 identified by the MAC address 1134 of the information is in use by the application equipped in the client computer 60. The PUC 1136 is indicating the number of applications which uses the sensor node 40 identified by the MAC address 1134 of the information. The LUF 1137 is the logic node use information indicating whether or not the sensor node 40 identified by the MAC address 1134 of the information is provided as a logic node identified by the LID 1131 of the information. The PUF 1135 and the LUF 1137 will be described in greater details herein below with reference to FIG. 8 and FIG. 9.

The installation date and time 1138 is the date and time information of installation of the logic node identified by the LID 1131 of the information. The removal date and time 1139 is the date and time of removal of the logic node identified by the LID 1131 of the information.

The configuration information is the information item to be set to the logic node. The configuration information item includes the observation cycle 1140. The observation cycle 1140 is the cycle of observation of the environment information by the logic node identified by the LID 1131 of the information.

The observation information is the environment information immediately previously observed by the logic node. The observation information includes a temperature 1141, an LQI (link quality indicator) 1142, a voltage 1143, and previous communication date and time 1144.

The previous communication date and time 1144 indicates the date and time of previous communication between the logic node identified by the LID 1131 of the information and the sensor net server 10.

The temperature 1141 is the temperature observed by the logic node identified by the LID 1131 of the information at the previous communication date and time 1144 of the information. The LQI 1142 is the value indicating the communication link quality of the logic node identified by the LID 1131 of the information at the previous communication date and time 1144 of the information. The voltage 1143 is the voltage of the battery equipped in the logic node identified by the LID 1131 of the information at the previous communication date and time 1144 of the information.

FIG. 8 is a table indicating PUF and LUF according to the preferred embodiment of the present invention.

The PUF indicates whether or not the sensor node 40 is currently in use by the application equipped in the client computer 60. If the sensor node 40 is currently used by an application, the PUF will be "T". On the other hand if the sensor node 40 is currently not used by an application then the PUF will be "F".

The LUF indicates whether or not the sensor node 40 is currently in use as the logic node. If the sensor node 40 is currently provided as a logic node, then the LUF will be "T". On the other hand if the sensor node 40 is currently not provided as the logic node, then the LUF will be "F".

FIG. 9 is a table indicating PUF and LUF according to the preferred embodiment of the present invention.

If the PUF is "F" and the LUF is "T" then the sensor node 40 provided as the logic node exists, but is not used by an application.

If the PUF is "T" and the LUF is "T", then the sensor node 40 provided as the logic node exists, and is currently used by an application.

If the PUF is "T" and the LUF is "F" then the sensor node 40 is used by an application but is temporarily used for another purpose than the designated purpose of the logic node.

For replacing a sensor node in the sensor net system, the sensor node, which is not used by an application but is connected, is required to be selected as the replacing sensor node. For this reason it is required for each sensor node to be managed whether each sensor node is used by an application and in addition exists. For a sensor node to migrate, the sensor node is required to be managed whether it is used for another purpose. In the preferred embodiment of the present invention the replacement and displacement of a sensor node is enabled by managing the sensor node status by using identifiers referred to as PUF and LUF.

Figure 10:
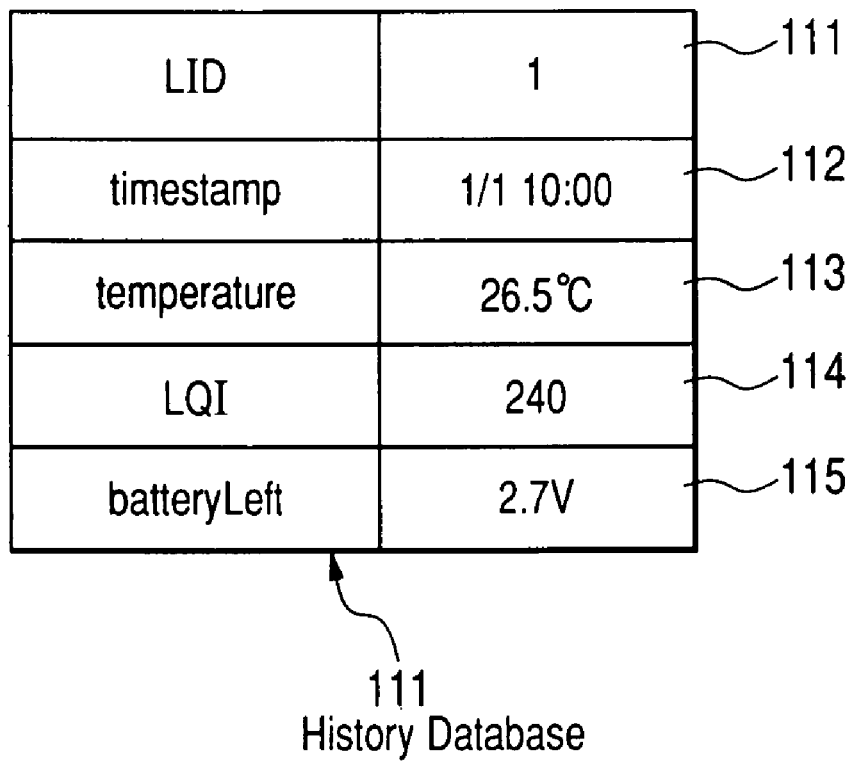
FIG. 10 is a table indicating information to be stored in the history database of the sensor net server according to the preferred embodiment of the present invention.

FIG. 10 is a table indicating information to be stored in the history database 111 of the sensor net server 10 according to the preferred embodiment of the present invention.

In the history database 111 the environment information observed by the logic node is stored as history, once for each observation.

The environment information to be stored in the history database 111 includes a LID 1111, a date and time of observation 1112, a temperature 1113, an LQI 1114, and a voltage 1115.

The LID 1111 is a unique identifier of the logic node which observes the appropriate environment information. The date and time of observation 1112 is the date and time of observation of the appropriate environment information. The temperature 1113 is the temperature observed by the logic node identified by the LID 1111 of the appropriate environment information at the date and time of observation 1112 of the environment information.

The LQI 1114 is the value indicating the communication link quality of the logic node identified by the LID 1111 of the appropriate environment information, at the date and time of observation 1112 of the environment information. The voltage 1115 is the voltage of the battery equipped in the logic node identified by the LID 1111 of the appropriate environment information, at the date and time of observation 1112 of the appropriate environment information.

Figure 11:
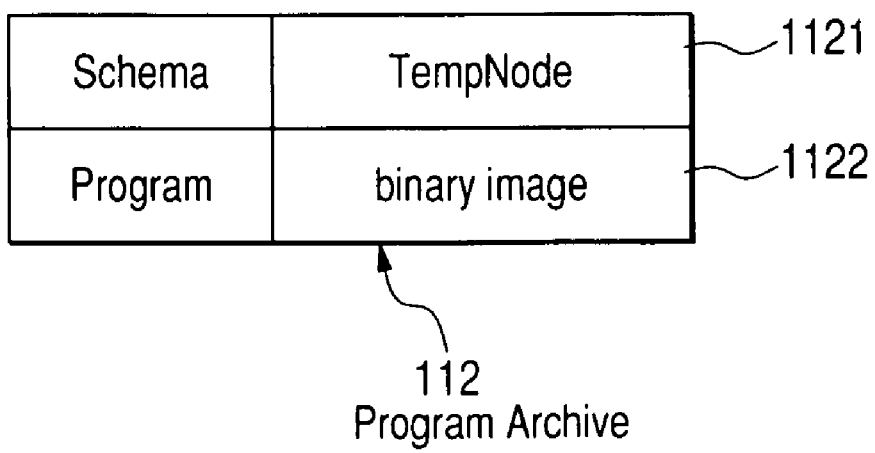
FIG. 11 is a schematic diagram indicating the program archive of the sensor net server according to the preferred embodiment of the present invention.

FIG. 11 is a schematic diagram indicating the program archive 112 of the sensor net server 10 according to the preferred embodiment of the present invention.

The program archive 112 stores all programs to be distributed to the sensor nodes 40 which are provided as logic node.

The program archive 112 stores a program 1122 corresponding to a scheme 1121. The scheme 1121 indicates the type of logic node. The program 1122 is to be distributed to the sensor nodes 40 provided as logic node corresponding to the scheme 1121.

Figure 12:
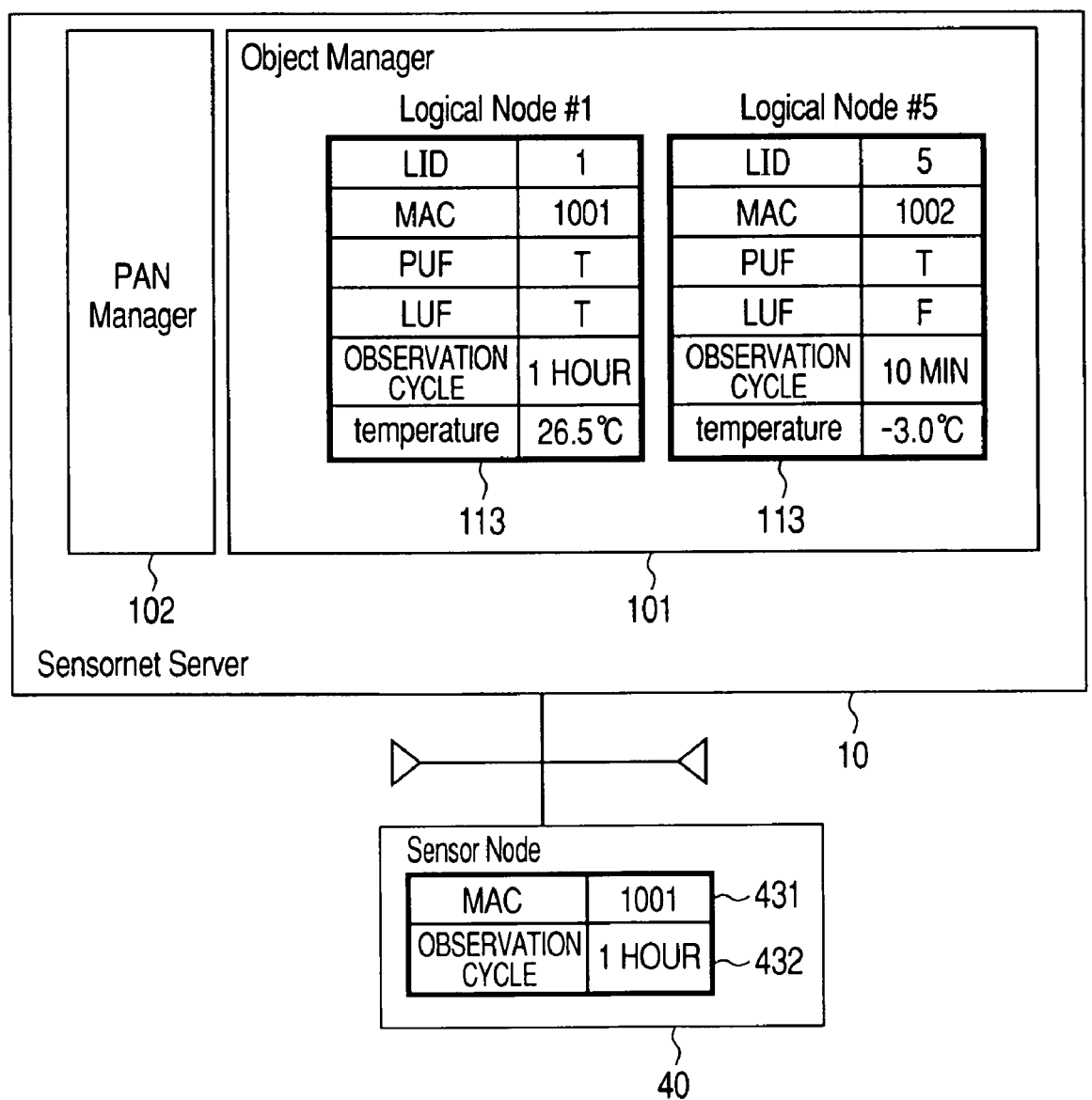
FIG. 12 is a schematic diagram indicating a logic node according to the preferred embodiment of the present invention.

Now referring to FIG. 12, there is a schematic diagram indicating a logic node according to the preferred embodiment of the present invention.

The object manager 101 contained in the sensor net server 10 will set one or more logic nodes for one single sensor node 40. The object manager 101 then stores the information about each logic node in the object list 113.

In the figure the object manager 101 assigns to the sensor node 40 identified by the MAC address "1001" the logic node identified as LID "1" and the logic node identified as LID "5".

The logic node identified as LID "1" has PUF "T" and LUF "T". The object manager 101 therefore provides the sensor node 40 identified by MAC address "1001" as logic node identified as LID "1". In addition, the sensor node 40 identified by MAC address "1001" is currently in use by an application equipped in the client computer 60.

The object manager 101 then sets the observation cycle of "1 hour" to the logic node identified by LID "1". "1001" of the MAC address 431 of the sensor node 40 and "1 hour" of the observation cycle 432 are therefore stored in the external storage unit 412 of the sensor node 40.

The sensor node 40 wakes up every "1 hour" of the observation cycle 432 stored in the external storage unit 412 to observe the environment information. The sensor node 40 uses "1001" of the MAC address 431 stored in the external storage unit 412 in addition to the observed environment information as an event to be transmitted to the sensor net server 10.

Figure 13:
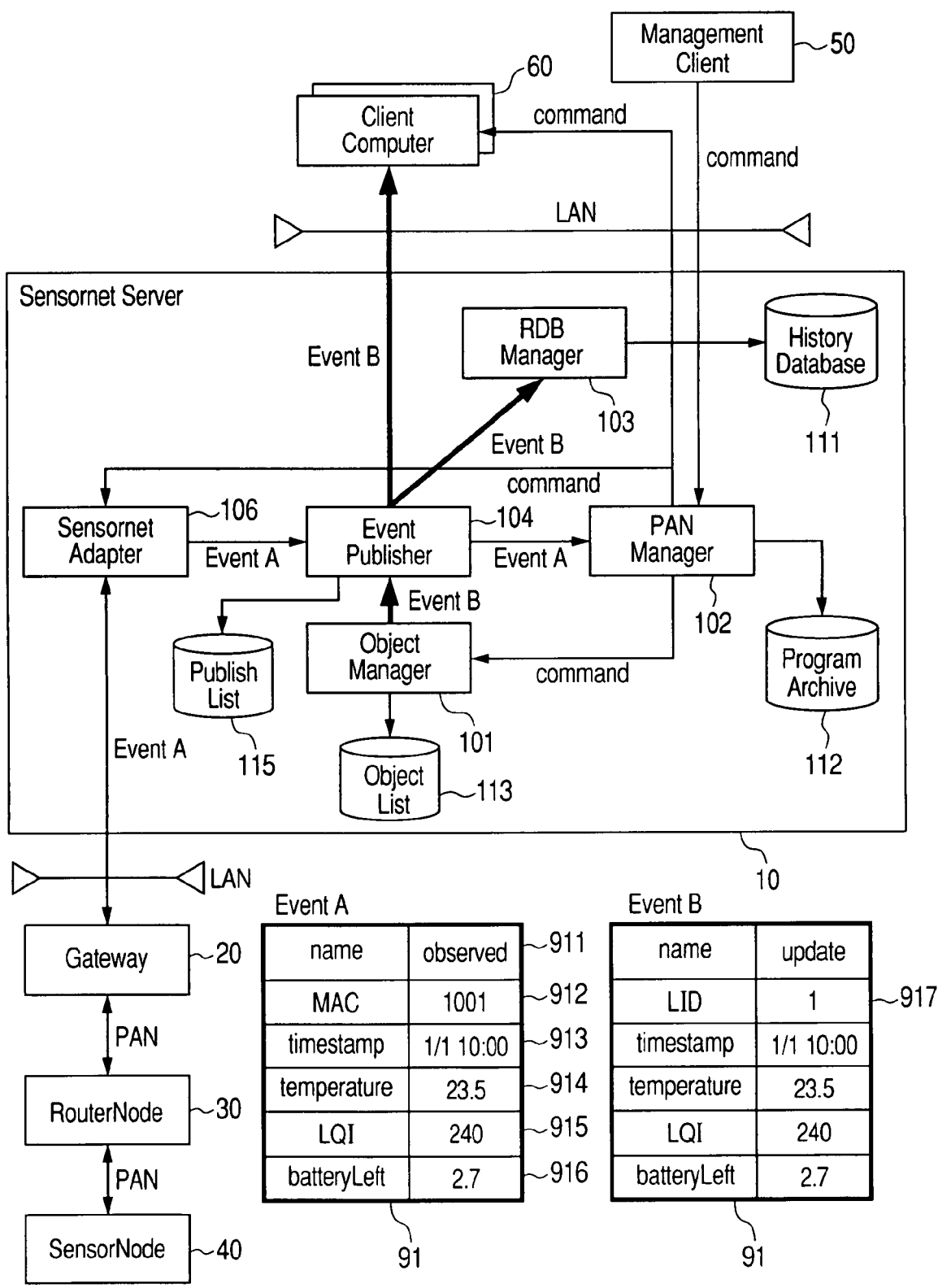
FIG. 13 is a schematic block diagram of event processing in the sensor net system according to the preferred embodiment of the present invention.

FIG. 13 is a schematic block diagram of event processing in the sensor net system according to the preferred embodiment of the present invention.

The sensor node 40 uses the observed environment information as the event A 91 to transmit to the sensor net server 10 through the router node 30 and the gateway 20.

The event 91 includes a name of event 911, a MAC address 912, a date and time of observation 913, a temperature 914, an LQI 915, and a voltage 916.

The name of event 911 indicates the type of the event. the name of event 91 of the event A 91 indicates that the event A 91 includes the observation information. The MAC address 912 is the MAC address of the sensor node 40 which has observed the observation information corresponding to the event 91. The date and time of observation 913 is the date and time at which the observation information has been observed corresponding to the event 91. The temperature 914 is the temperature observed by the sensor node 40 identified by the MAC address 912 of the event 91 at the date and time of observation 913 of the event 91.

The LQI 915 is a value indicating the communication link quality of the sensor node 40 identified by the MAC address 912 of the event 91 at the date and time of observation 913 of the event 91. The voltage 916 is a voltage of the battery 416 contained in the sensor node 40 identified by the MAC address 912 of the event 91 at the date and time of observation 913 of the event 91.

The sensor net adaptor 106 equipped in the sensor net server 10 receives the event A 91 from the sensor node 40. Then the sensor net adaptor 106 transfers the received event A 91 to the event publisher unit 104.

The event publisher unit 104, in turn, receives the event A 91 from the sensor net adaptor 106. Then, the event publisher unit 104 refers the publishing list 115 to determine the destination of the received event A 91. In this example the event publisher unit 104 determines that the PAN manager 102 is the destination of the event A 91. Next, the event publisher unit 104 transmits the received event A 91 to the PAN manager 102 determined as the destination.

The PAN manager 102 in turn receives event A 91 from the event publisher unit 104. Then the PAN manager 102 will transmit an object list update request to the object manager 101.

The object manager 101, upon reception of the object list update request from the PAN manager 102, will update the object list 113.

More specifically, the object manager 101 will select from within the object list 113 the information item in which the MAC address 912 of the event A 91 received by the PAN manager 102 is matched with the MAC address 1134 of the object list 113.

The object manager 101 will create a new logic node if it cannot select the matching information of MAC address from within the object list 113. The new logic node creation processing will be described in greater details with reference to FIG. 17 below.

Next, the object manager 101 will determine whether "T" is stored in the LUF 1137 of the information selected from within the object list 113. If "F" is stored in the LUF 1137 then the object manager 101 will create a new logic node.

If The LUF 1137 contains "T" then the object manager 101 will update the observation information contained in the information selected from within the object list 113.

In this example the object manager 101 will store the temperature 914 of the event A 91 received by the PAN manager 102 into the temperature 1141 of the information selected from within the object list 113. Next, the object manager 101 will store the LQI 915 of the event A 91 received by the PAN manager 102 into the LQI 1142 of the information selected from within the object list 113.

Next, the object manager 101 will store the voltage 916 of the event A 91 received by the PAN manager 102 into the voltage 1143 of the information selected from within the object list 113. Next, the object manager 101 will store the date and time of observation 913 of the event A 91 received by the PAN manager 102 into the previous communication date and time 1144 of the information selected from within the object list 113.

Next, the object manager 101 will determine whether or not the PUF 1135 of the information selected from within the object list 113 contains "T".

If the PUF 1135 contains "T" the object manager 101 will create an event B 91 based on the event A 91 received by the PAN manager 102 and the information selected from within the object list 113. More specifically, the object manager 101 will change "observed" stored in the name of event 911 of the event A 91 to "update" indicating update information. Furthermore, the object manager 101 will change "1001" of the MAC address 912 of the event A 91 to "1" of the LID 1131 of the information selected from within the object list 113.

The object manager 101 creates the event B 91 as have been described above. The event B 91 thus includes the LID 917 instead of the MAC address 912. The LID 917 is a unique identifier of logic nodes which observe the observation information corresponding to the event 91.

The object manager 101 then transmits thus created event B 91 to the event publisher unit 104.

The event publisher unit 104 receives the event B 91. The event publisher unit 104 then refers to the publishing list 115 to determine the destination of the received event B 91. In this example the event publisher unit 104 will determine the RDB manager 103 and the client computer 60 as the destination of the event B 91. Next, the event publisher unit 104 will transmit the received event B 91 to the RDB manager 103 and the client computer 60 as determined as the destination of transmission.

The RDB manager 103 in turn receives the event B 91 from the event publisher unit 104. Then the RDB manager 103 will store the contents of the received event B 91 into the history database 111.

More specifically, the RDB manager 103 stores the LID 917 of the received event B 91 into the LID 1111 of the history database 111. Then the RDB manager 103 stores the date and time of observation 913 of the received event B 91 into the date and time of observation 1112 of the history database 111. Next, the RDB manager 103 stores the temperature 914 of the event B 91 into the temperature 1113 of the history database 111. Next the RDB manager 103 stores the LQI 915 of the event B 91 into the LQI 1114 of the history database 111. Next, the RDB manager 103 stores the voltage 916 of the received event B 91 into the voltage 1115 of the history database 111.

In this manner the RDB manager 103 may update the history database 111.

On the other hand, the client computer 60 receives the event B 91 from the event publisher unit 104. Then the application residing on the client computer 60 refers to the received event B 91 for performing various processing. Exemplary processing by the application residing on the client computer 60 will be described in greater details herein below with reference to FIG. 16A and FIG. 16B.

The management computer 50, on the other hand, transmits to the PAN manager 102 a logic node use request or a logic node disuse request. The use request contains the LID of the logic node required to start using. The disuse request contains the LID of the logic node required to stop using.

The PAN manager 102, upon reception of the use request, transmits an object list update request to the object manager 101.

The object manager 101 receiving the object list update request from the PAN manager 102 updates the object list 113.

More specifically, the object manager 101 selects from the object list 113 the information item in which the LID contained in the use request received by the PAN manager 102 matches with the LID 1131 of the object list 113. Then the object manager 101 stores "T" to the PUF 1135 of the information selected from within the object list 113. Next, the object manager 101 adds "1" to the PUC 1136 of the information selected from within the object list 113. In addition, the object manager 101 extracts the scheme 1133, the MAC address 1134, and the observation cycle 1140 from the information selected from within the object list 113. Thereafter the object manager 101 transmits thus extracted scheme 1133, the MAC address 1134, and the observation cycle 1140 to the PAN manager 102.

The PAN manager 102 receives from the object manager 101 the scheme 1133, the MAC address 1134, and the observation cycle 1140. Next, the PAN manager 102 transmits the received observation cycle 1140 to the sensor node 40 identified by the received MAC address 1134. In this manner the PAN manager 102 requests the start of use to the sensor node 40 identified by the received MAC address 1134.

Then the PAN manager 102 may transfer a program to be executed in the sensor node 40 to the sensor node 40. More specifically, the PAN manager 102 extracts from the program archive 112 a program 1122 corresponding to the scheme received from the object manager 101. Then the PAN manager 102 transmits thus extracted program 1122 to the sensor node 40 identified by the received MAC address 1134.

On the other hand the PAN manager 102, upon reception of a disuse request, will request the termination of use of logic node to the application residing on the client computer 60. Then, the PAN manager 102 transmits an object list update request to the object manager 101.

The object manager 101, upon reception of the object list update request from the PAN manager 102, will update the object list 113.

More specifically, the object manager 101 selects from within the object list 113 the information item in which the LID contained in the disuse request received by the PAN manager 102 matches with the LID 1131 of the object list 113. Then the object manager 101 subtracts "1" from the PUC 1136 of the information selected from within the object list 113. Next, the object manager 101 determines whether or not the PUC 1136 after subtraction is "0". If the PUC 1136 is "0" then the object manager 101 will store "F" to the PUF 1135 of the information selected from within the object list 113.

Figure 14:
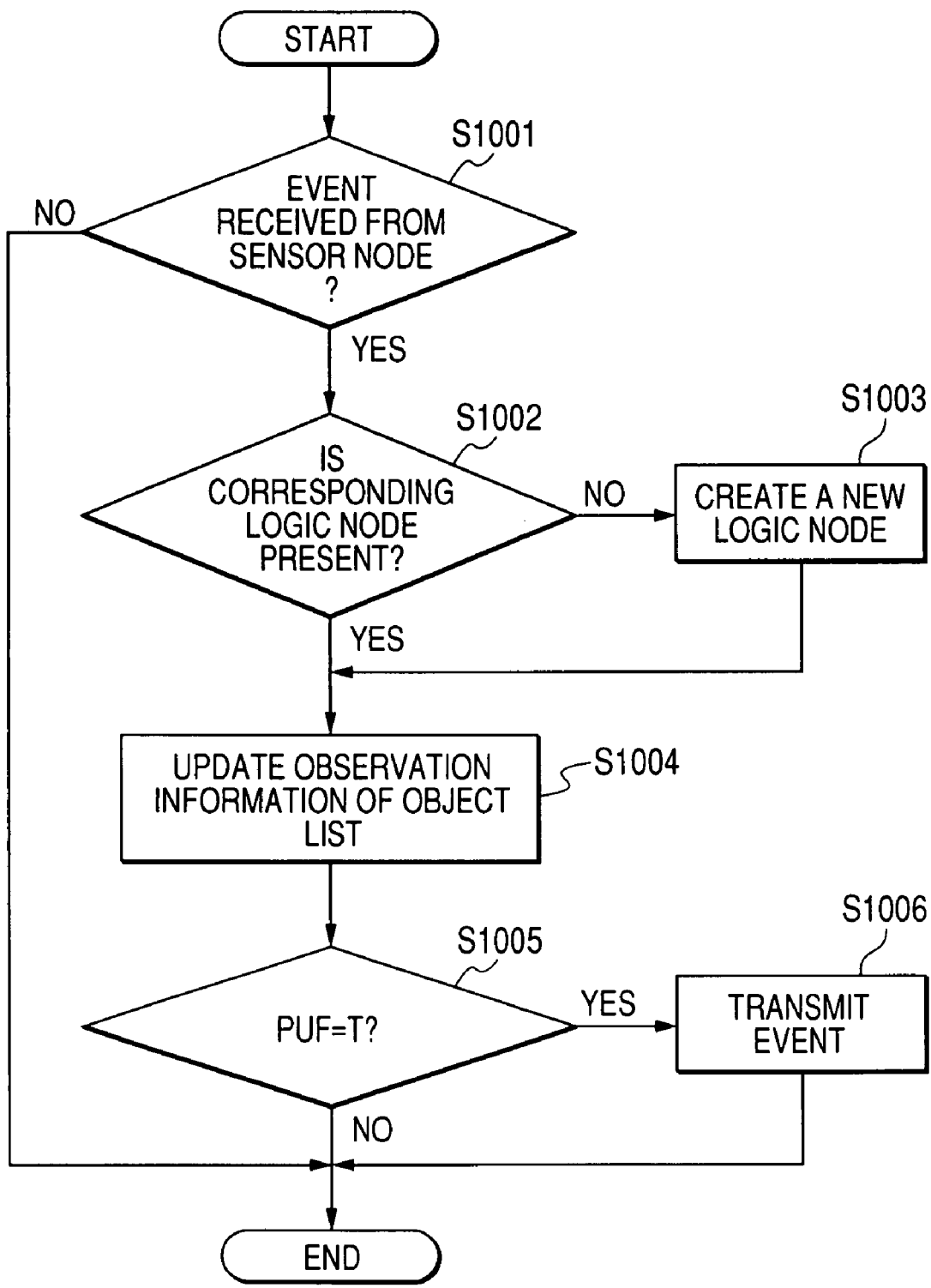
FIG. 14 is a flowchart of the process in the sensor net server at the time of event reception according to the preferred embodiment of the present invention.

FIG. 14 is a flowchart of the process in the sensor net server 10 at the time of event reception according to the preferred embodiment of the present invention.

First, the sensor net server 10 determines whether or not the event 91 is received from the sensor node 40 (S1001). If the event 91 is not yet received, then the sensor net server 10 will terminate the process. Then the sensor net server 10 will wait until it receives another event 91. Thereafter, the sensor net server 10 will perform the process again when it receives another new event 91.

On the other hand, when an event 91 is received then the sensor net server 10 will determine whether or not there is a corresponding logic node in the event 91 (S1002).

More specifically, the sensor net server 10 selects from within the object list 113 the information item in which the MAC address 912 of the received event 91 matches with the MAC address 1134 of the object list 113.

If the sensor net server 10 fails to select from within the object list 113 the information item in which the MAC addresses are matched, then it will determine that there is not a logic node corresponding to the event 91.

On the other hand, if the sensor net server 10 successfully selects from within the object list 113 the information item in which the MAC addresses are matched, then it will determine whether or not the LUF 1137 of the information selected from within the object list 113 contains "T". If the LUF 1137 contains "F" then the sensor net server 10 will determine that there is not a corresponding logic node in the event 91.

If the LUF 1137 contains "T", on the other hand, the sensor net server 10 will determine that there is a corresponding logic node in the event 91. In this case the sensor net server 10 will proceed to step S1004.

If there is not a corresponding logic node in the event 91, then the sensor net server 10 will create a new logic node based on the received event 91 (S1003).

More specifically, the sensor net server 10 creates in the object list 113 the information on a new logic node. The sensor net server 10 stores a value which is unique among all LID 1131 included in the object list 113 to the LID 1131 of the information on the new logic node. Then, the sensor net server 10 stores the MAC address 912 of the received event 91 into the MAC address 1134 of the information on the new logic node.

Next, the sensor net server 10 stores "F" into the PUF 1135 of the information on the new logic node. Next, the sensor net server 10 stores "1" into the PUC 1136 of the information on the new logic node. Next, the sensor net server 10 stores "T" into the LUF 1137 of the information on the new logic node.

Next, the sensor net server 10 will store the current date and time into the installation date and time 1138 of the information on the new logic node.

As can be appreciated from the foregoing description, the sensor net server 10 creates a new logic node.

Thereafter the sensor net server 10 updates the observation information of the object list 113 (S1004).

More specifically, the sensor net server 10 selects from within the object list 113 all information items in which the MAC address 912 of the received event 91 matches with the MAC address 1134 of the object list 113. Next, the sensor net server 10 selects the information item which stores "T" in the LUF 1137 from within the all information items selected from within the object list 113.

Next, the sensor net server 10 stores the temperature 914 of the received event 91 into the temperature 1141 of the information selected from the object list 113. Next, the sensor net server 10 stores the LQI 915 of the received event 91 into the LQI 1142 of the information selected from within the object list 113.

Next, the sensor net server 10 stores the voltage 916 of the received event 91 into the voltage 1143 of the information selected from within the object list 113. Next, the sensor net server 10 stores the date and time of observation 913 of the received event 91 into the previous communication date and time 1144 of the information selected from within the object list 113.

Next, the sensor net server 10 determines whether or not the PUF 1135 of the information selected from within the object list 113 contains "T" (S1005).

If the PUF 1135 contains "F", then the sensor node 40 corresponding to the logic node is not used by the application residing in the client computer 60. Therefore the sensor net server 10 will terminate the process immediately.

On the other hand, if the PUF 1135 contains "T", then the sensor node 40 corresponding to the logic node is used by the application residing on the client computer 60. The sensor net server 10 in this case will create a new event 91 based on the received event 91 and the information selected from within the object list 113.

Next, the sensor net server 10 refers to the publishing list 115 to determine the destination of thus created new event 91. Next, the sensor net server 10 transmits thus created new event 91 to the determined destination (S1006). Thereafter the sensor net server 10 terminates the process.

Figure 15:
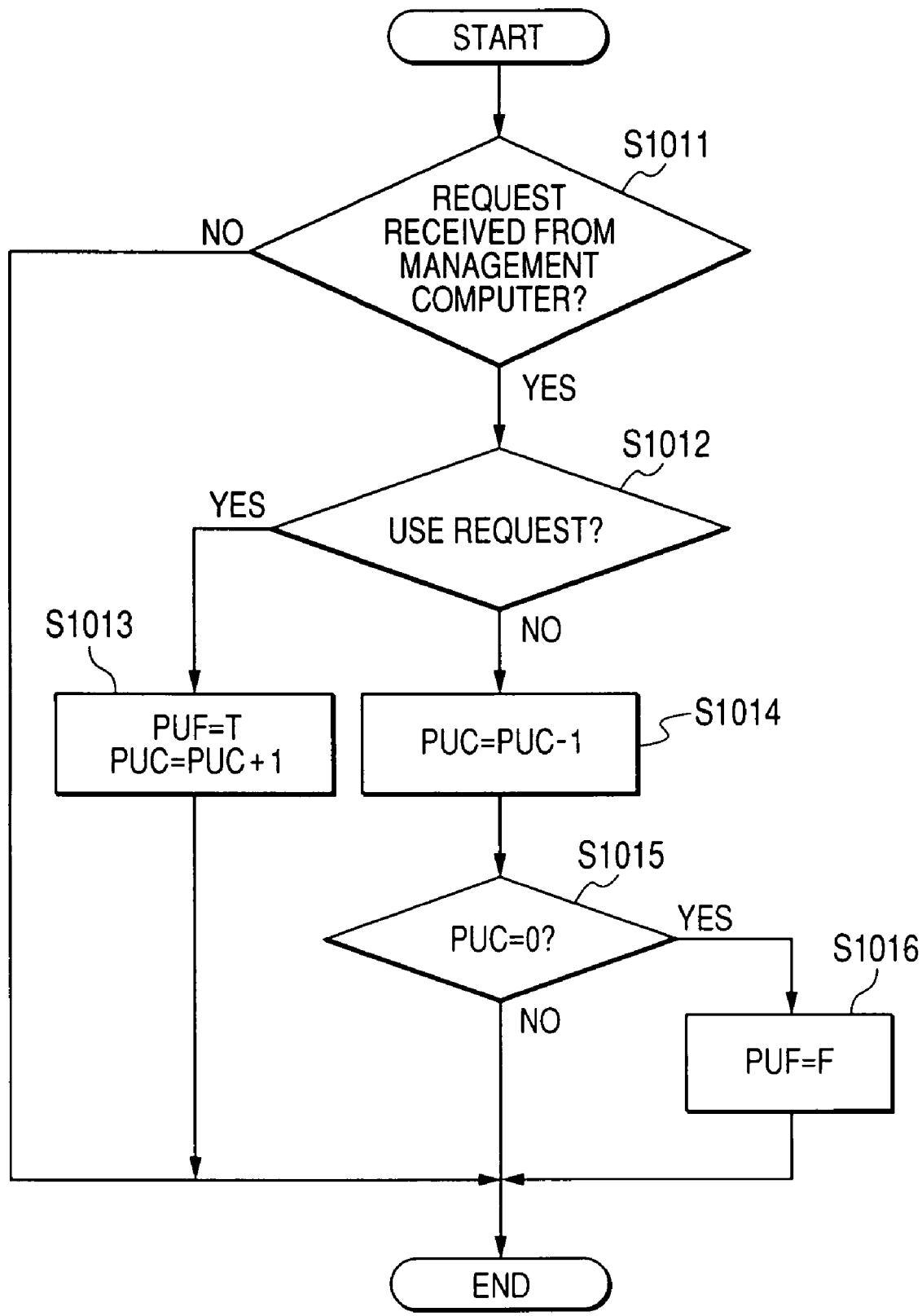
FIG. 15 is a flowchart of the process in the sensor net server at the time of reception of a request from the management computer according to the preferred embodiment of the present invention.

FIG. 15 is a flowchart of the process in the sensor net server 10 at the time of reception of a request from the management computer 50 according to the preferred embodiment of the present invention.

First, the sensor net server 10 determines whether or not it has received a request from the management computer 50 (S1011). If it has not received a request, the sensor net server 10 will terminate the process. Thereafter the sensor net server 10 will wait until another request is received. The sensor net server 10 will restart performing the process when receiving another new request.

On the other hand, when the sensor net server 10 has received a request then it determines whether or not it has received a use request (S1012). If a use request is received then the sensor net server 10 selects from within the object list 113 the information item in which the LID contained in the use request received matches the LID 1131 of the object list 113. Then the sensor net server 10 stores "T" into the PUF 1135 of the information selected from within the object list 113. Next, the sensor net server 10 adds "1" to the PUC 1136 of the information selected from within the object list 113 (S1013).

By doing this the logic node requested to use will be available from the application. Then the sensor net server 10 will terminate the process.

On the other hand when the sensor net server 10 has received a disuse request then it selects from within the object list 113 the information item in which the LID contained in the received disuse request matches with the LID 1131 of the object list 113. Next, the sensor net server 10 subtracts "1" from the PUC 1136 of the information selected from within the object list 113 (S1014).

Next, the sensor net server 10 determines whether or not the PUC 1136 after subtraction is "0" (S1015). If the PUC 1136 after subtraction is not "0" then the logic node requested to disuse is used by another application. Therefore the sensor net server 10 will terminate the process immediately.

On the other hand if the PUC 1136 after subtraction is "0" then the logic node requested to disuse is not used by any application. Therefore the sensor net server 10 stores "F" into the PUF 1135 of the information selected from within the object list 113. Then the sensor net server 10 will terminate the process.

Figure 16A:
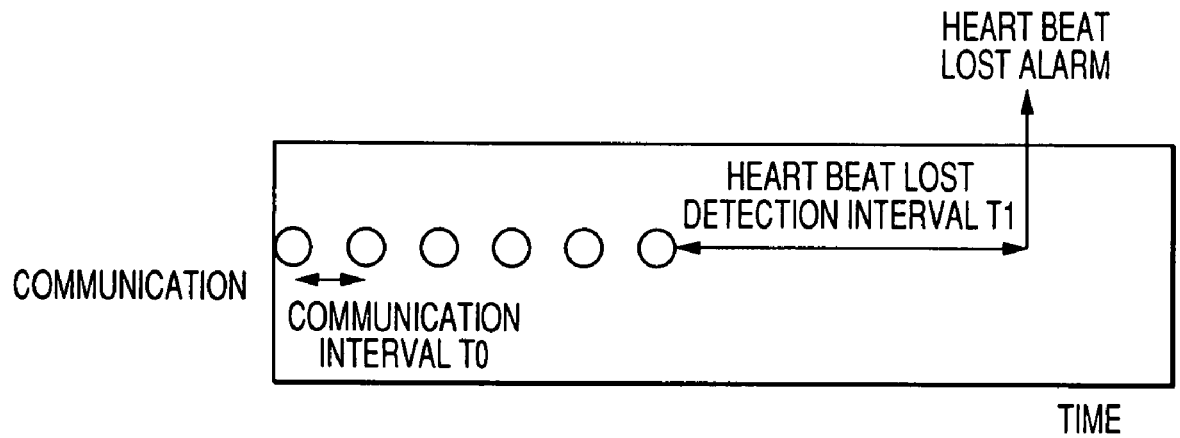
FIG. 16A is a schematic diagram illustrating an exemplary application process to be executed in the client computer according to the preferred embodiment of the present invention.

FIG. 16A is a schematic diagram illustrating an exemplary application process to be executed in the client computer 60 according to the preferred embodiment of the present invention.

In the figure the sensor node 40 in the sane status transmits the observed environment information as an event to the sensor net server 10 at the predefined communication interval T0. Therefore as long as the sensor node 40 is in the sane status then the sensor net server 10 will transmits events to the application residing on the client computer 60 at the preset communication interval T0.

In this circumstance the application monitors the receiving interval of events. When the event receiving interval becomes longer than a predetermined detection interval T1, then the application will determine that there is a failure in the sensor node 40. The application then will output a warning. The application is capable of signaling the failure of the sensor node 40 to the client who operates the client computer 60 in this manner.

Figure 16B:
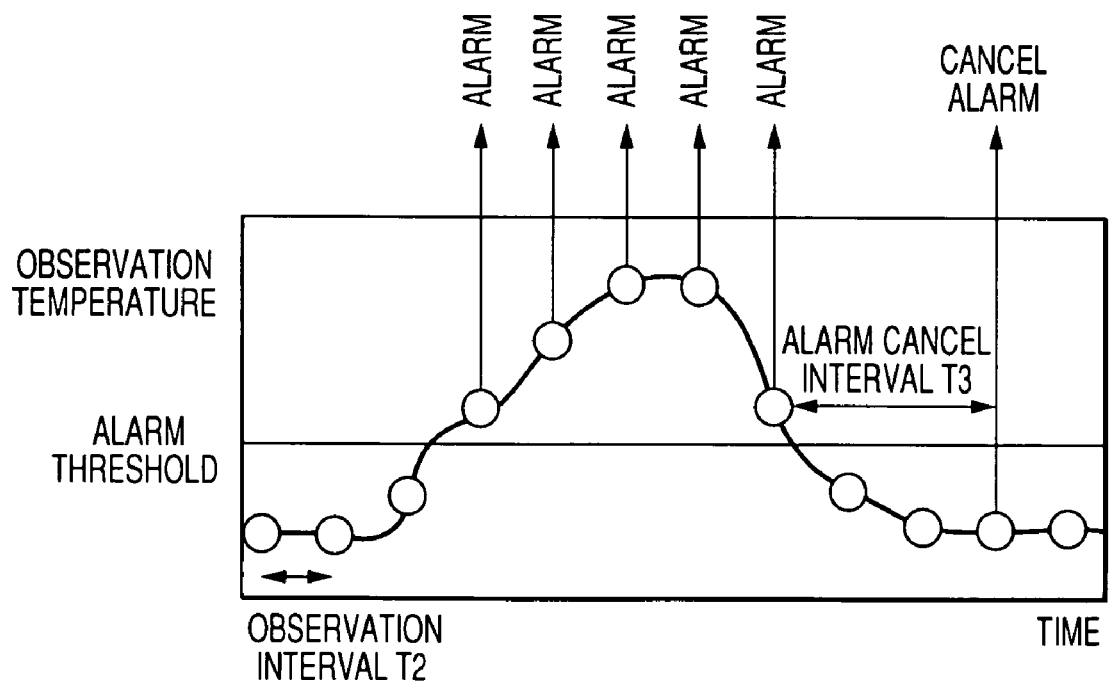
FIG. 16B is a schematic diagram illustrating an exemplary application process to be executed in the client computer according to the preferred embodiment of the present invention.

FIG. 16B is a schematic diagram illustrating an exemplary process by the application residing on the client computer 60 according to the preferred embodiment of the present invention.

In this figure the sensor node 40 observes the temperature at the predefined observation interval T2. Next, the sensor node 40 transmits to the sensor net server 10 the observed temperature as an event. The sensor net server 10 thereby transmits the observed temperature as event at every observation interval T2 to the application residing on the client computer 60.

The application in these circumstances monitors the observed temperature by the sensor node 40. More specifically, the application determines whether or not the temperature observed by the sensor node 40 is beyond a predefined alarm threshold value. If the temperature observed by the sensor node 40 is over the alarm threshold value then the application will determine that there is an abnormal situation in the environment where the sensor node 40 is installed. Then the application will output a warning. The application is then capable of signaling the anomaly of the environment where the sensor node 40 is installed to the client who operates the client computer 60 in this manner.

Thereafter, the application monitors the elapsed time since the last moment that temperature observed by the sensor node 40 has been over the alarm threshold level. At the time when the elapsed time since the last moment that temperature observed by the sensor node 40 has been over the alarm threshold level becomes longer than a predefined alarm reset interval T3, then the application will determines that the environment where the sensor node 40 is installed regains the normal situation. Then the application outputs the cancel of warning. The application thereby is capable of signaling the client who operates the client computer 60 that the environment where the sensor node 40 is installed comes back to the normal situation.

Figure 17:
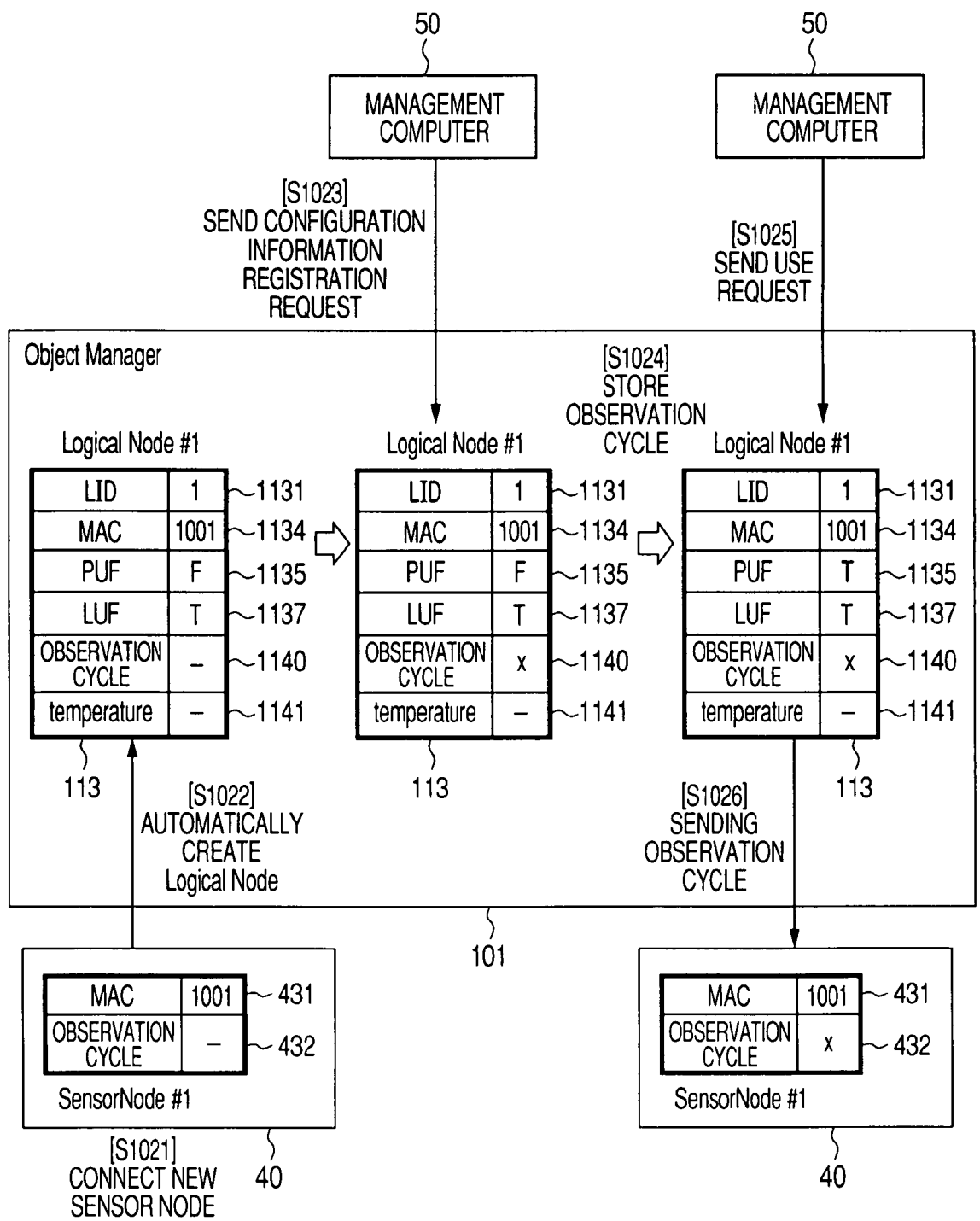
FIG. 17 is a schematic diagram illustrating the process performed by the sensor net system according to the preferred embodiment of the present invention when a sensor node is newly installed.

FIG. 17 is a schematic diagram illustrating the process performed by the sensor net system according to the preferred embodiment of the present invention when a sensor node 40 is newly installed.

First, a sensor node 40 is newly connected to the sensor net server 10 through PAN (S1021). The newly connected sensor node 40 then transmits to the sensor net server 10 the event 91 including the MAC address 431 stored in the external storage unit 412. The sensor net server 10 in turn receives the event 91 from the newly connected sensor node 40. The object manager 101 residing on the sensor net server 10 then refers the received event 91 to automatically create a logic node corresponding to the newly connected sensor node 40 (S1022).

More specifically, the object manager 101 creates in the object list 113 the information about the new logic node. First, the object manager 101 stores a value which is unique among all LID 1131 contained in the object list 113 into the LID 1131 of the information on the new logic node. Next, the object manager 101 stores the MAC address 912 contained in the received event 91 into the MAC address 1134 of the information on the new logic node.

Next, the object manager 101 stores "F" in the PUF 1135 of the information on the new logic node. Next, the object manager 101 stores "0" in the PUC 1136 of the information of the new logic node. Next, the object manager 101 stores "T" in the LUF 1137 of the information of the new logic node. Next, the object manager 101 stores the current date and time into the installation date and time 1138 of the information of the new logic node.

In this manner the object manager 101 creates a new logic node.

Thereafter, the management computer 50 is triggered by the operation by the administrator to transmit a configuration information registration request to the object manager 101 residing in the sensor net server 10 (S1023). The configuration information registration request contains the LID of the logic node and the observation cycle to be set in the logic node.

The object manager 101 receives the configuration information registration request from the management computer 50. The object manager 101 then selects from the object list 113 the information item in which the LID contained in the received configuration information registration request matches with the LID 1131 of the object list 113. Next, the object manager 101 stores the observation cycle contained in the received configuration information registration request into the observation cycle 1140 of the information selected from the object list 113 (S1024).

Thereafter, the management computer 50 is triggered by the operation by the administrator to transmit a use request to the object manager 101 residing on the sensor net server 10 (S1025). The use request includes the LID of logic node requested to start using.

The object manager 101 receives the use request from the management computer 50. Then the object manager 101 selects from the object list 113 the information item in which the LID contained in the received use request matches with the LID 1131 of the object list 113. Then the object manager 101 stores "T" into the PUF 1135 of the information selected from the object list 113.

Next, the object manager 101 extracts the MAC address 1134 and the observation cycle 1140 of the information selected from the object list 113. Then the object manager 101 transmits thus extracted observation cycle 1140 to the sensor node 40 identified by the MAC address 1134 extracted (S1026).

The sensor node 40 receives the observation cycle 1140 from the object manager 101. Then the sensor node 40 stores the received observation cycle 1140 into the external storage unit 412. The sensor node 40 thereby will be able to observe the environment information for each observation cycle 432 stored in the external storage unit 412.

Figure 18:
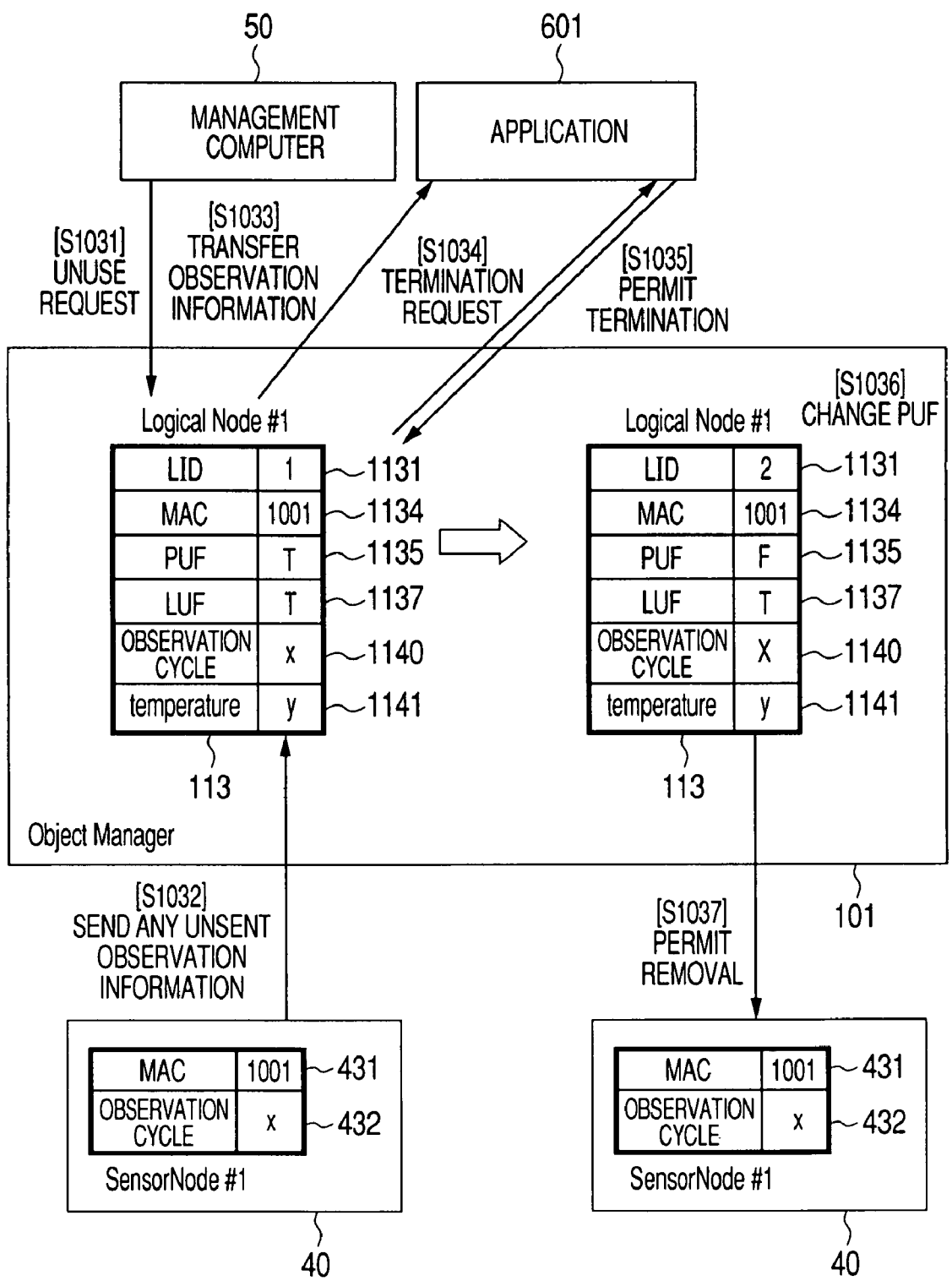
FIG. 18 is a schematic diagram illustrating the process performed in the sensor net system according to the preferred embodiment of the present invention when a sensor node is removed.

FIG. 18 is a schematic diagram illustrating the process performed in the sensor net system according to the preferred embodiment of the present invention when a sensor node 40 is removed.

First, the management computer 50 is triggered by the operation by the administrator to transmit a disuse request to the object manager 101 residing on the sensor net server 10 (S1031). The disuse request includes the LID of the logic node requested to stop using (to be removed).

The object manager 101 receives the disuse request from the management computer 50. Then the object manager 101 selects from the object list 113 the information item in which the LID included in the received disused request matches with the LID 1131 of the object list 113. Then the object manager 101 extracts the MAC address 1134 of the information selected from the object list 113.

Then the object manager 101 instructs to the sensor node 40 identified by the extracted MAC address 1134 to transmit any remaining unsent observation information. Then the sensor node 40 in turn will transmit to the object manager 101 residing on the sensor net server 10 any remaining unsent observation information (S1032).

The object manager 101 receives the observation information from the sensor node 40. Next, the object manager 101 transfers thus received observation information to the application 601 residing on the client computer 60 (S1033).

The object manager 101 then requests to terminate using the logic node identified by the LID contained in the received disuse request to all applications 601 using the appropriate logic node (S1034). The applications 601 when requested to terminate using the logic node will terminate the processing with respect to the designated logic node. Thereafter the applications 601 will notify the object manager 101 residing on the sensor net server 10 of the permission of terminating the use of the logic node (S1035).

When the object manager 101 receives the notification of the permission of terminating using the logic node from all applications 601 using the appropriate logic node, the logic node is not used by all these applications 601. Therefore the object manager 101 stores "0" into the PUC 1136 of the information selected from the object list 113. In addition, the object manager 101 stores "F" into the PUF 1135 of the information selected from the object list 113 (S1036).

Next, the object manager 101 notifies the sensor node 40 identified by the extracted MAC address 1134 of the permission of removal (S1037). The sensor node 40 once received the notification of removal permission outputs that the removal is allowed. For example, the sensor node 40 displays on the LCD 419 that the removal is allowed. Otherwise the sensor node 40 may flicker the LED 420 by the on/off pattern corresponding to the removal permission. The worker thereby may be facilitated to find out the removable sensor node 40 from within a plurality of sensor nodes 40 installed in the environment. The worker then will remove the sensor node 40 allowed to be removed.

Figure 19:
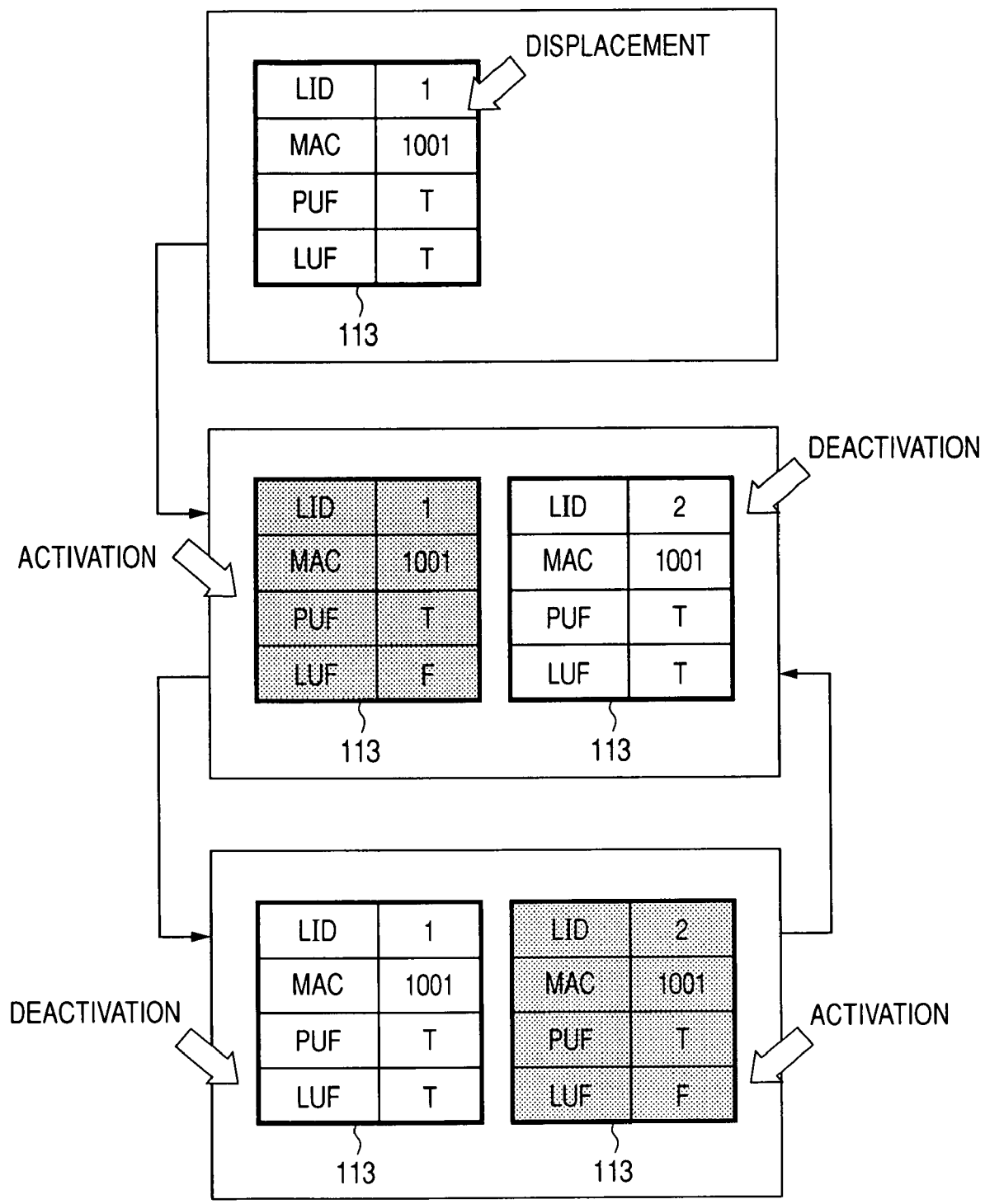
FIG. 19 is a schematic diagram illustrating the displacement, the activation, and the deactivation according to the preferred embodiment of the present invention.

FIG. 19 is a schematic diagram illustrating the displacement, the activation, and the deactivation according to the preferred embodiment of the present invention.

The displacement as used herein means moving a sensor node 40 from the location of original installation to another location. For example, the displacement indicates moving a sensor node 40 installed originally in a refrigerator to a warehouse. By doing this one sensor node 40 may be used in a different, another purpose.

The activation indicates enabling a logic node that is currently not used by an application 601. The deactivation, on the other hand, indicates disabling a logic node that is currently used by an application 601.

An activation request is to request to enable a currently unused logic node and to disable the logic node identified by the LID provided with the same MAC address as the MAC address extracted from the logic node. For example, in case in which a sensor node which is for originally use in a warehouse has been migrated into a refrigerator, the activation request is issued when the owner of the sensor node, the administrator of the warehouse, moves it back into the warehouse.

A deactivation request is to request to disable a logic node currently used and to enable the logic node identified by the LID provided with the same MAC address as the MAC address extracted from the logic node. For example, in case in which a sensor node which is for originally use in a warehouse has been migrated into a refrigerator, the deactivation request is issued when the borrower of the sensor node, the administrator of the refrigerator, brings back the sensor node into the original place in the warehouse. The processing by the sensor net server when receiving an activation request of a deactivation request will be described in greater details with reference to FIG. 21 and FIG. 22.

When displacing, the object manager 101 residing on the sensor net server 10 provides the sensor node 40 having been displaced as a newly created logic node. The application 601 residing on the client computer 60 thereby may recognize as if a new sensor node 40 has been installed. The displacement will be described in greater details with reference to FIG. 20.

In this case the object manager 101 residing on the sensor net server 10 sets the logic node identified by "1" in the LID and the logic node identified by "2" in the LID to the sensor node 113 identified by "1001" in the MAC address. The object manager 101 then provides to the application 601 residing on the client computer 60 the sensor node 113 identified by "1001" in the MAC address as either the logic node identified by "1" in the LID or the logic node identified by "2" in the LID.

Therefore, once the logic node identified by "1" of the LID is activated, the logic node identified by "2" of the LID will be deactivated. In a similar manner once the logic node identified by "2" of the LID the logic node identified by "1" of the LID will be deactivated.

In addition, once the logic node identified by "1" of the LID is deactivated the logic node identified by "2" of the LID will be activated. In a similar manner once the logic node identified by "2" of the LID is deactivated the logic node identified by "1" of the LID will be activated.

Figure 20:
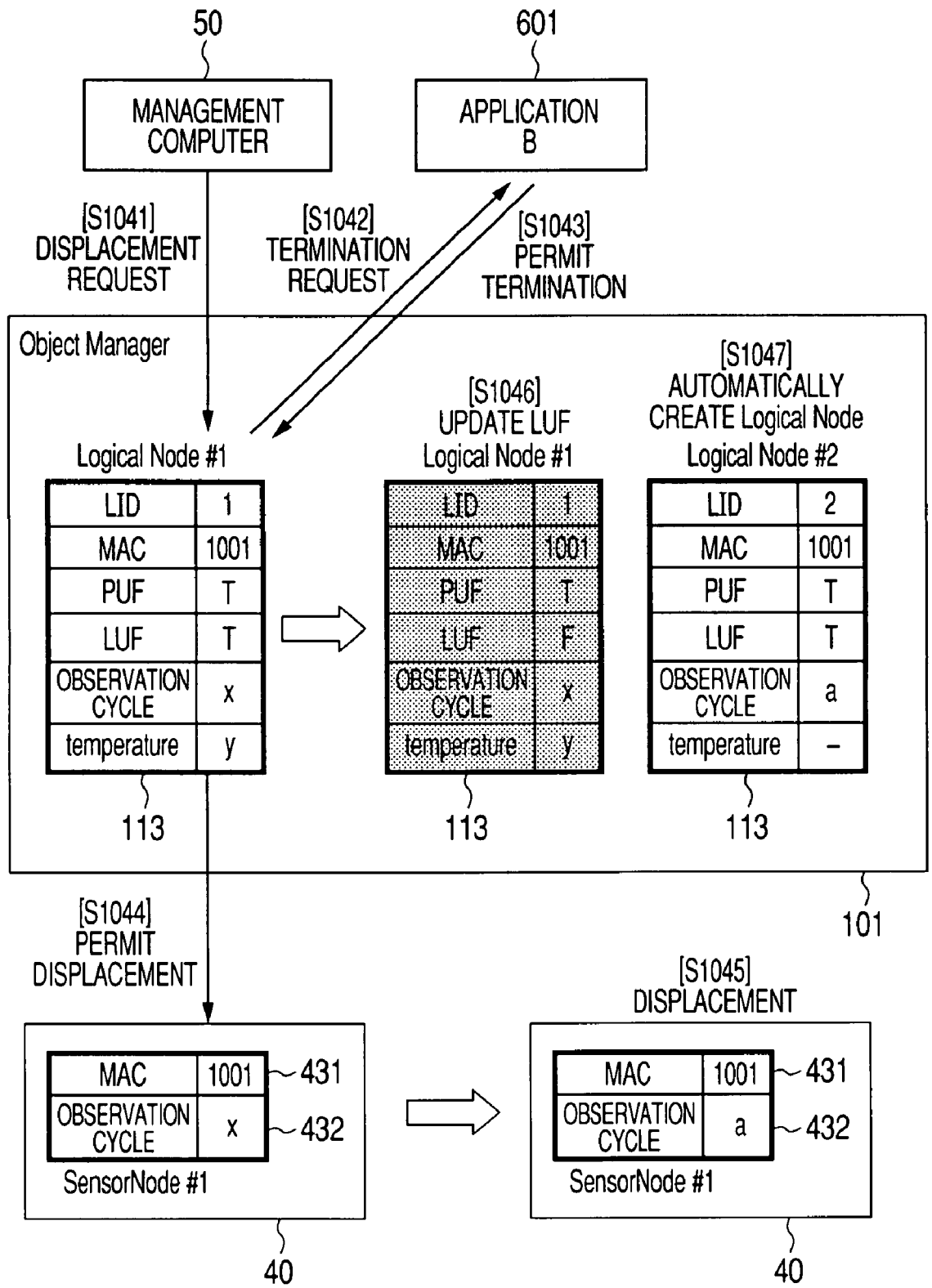
FIG. 20 is a schematic diagram of the process performed by the sensor net system according to the preferred embodiment of the present invention when a sensor node is migrated.

FIG. 20 is a schematic diagram of the process performed by the sensor net system according to the preferred embodiment of the present invention when a sensor node 40 is migrated.

First, the management computer 50 is triggered by the operation by the administrator to transmit the migration request to the object manager 101 of the sensor net server 10 (S1041). The migration request includes the LID of the logic node requested to be migrated.

The object manager 101 receives the migration request from the management computer 50. Then the object manager 101 requests the termination of use of the logic node identified by the LID included in the received migration request to every application 601 which uses the appropriate logic node (S1042). The application 601, upon reception of the request of termination of use of the logic node, will terminate the process with respect to the logic node. Thereafter the application 601 notifies the object manager 101 residing on the sensor net server 10 of the permission of termination of use of the logic node (S1043). When the object manager 101 receives the notification of the permission of termination of use of the logic node from all applications 601 which use the appropriate logic node, the logic node are not used by none of the applications 601. In this manner, the termination of use of the logic node is inquired to the application such that the application which uses the original sensor node to be migrated before migration will not obtain the observation value after migration, so as to be able to prevent recording the erroneous observation value as well as outputting an alarm along therewith. Since the sensor node will be used by another application after migration, the PUF must be left as "T".

Then the object manager 101 selects from the object list 113 the information in which the LID included in the received migration request matches with the LID 1131 of the object list 113. Next the object manager 101 will extract the MAC address 1134 of the selected information from the object list 113.

Next, the object manager 101 will notify the sensor node 40 identified by the extracted MAC address 1134 of the permission of migration (S1044). Then the object manager 101 will transmit the observation cycle 1140 to be set after migration to the sensor node 40 identified by the extracted MAC address 1134. The sensor node 40 in turn will store the observation cycle 1140 thus received into the external storage unit 412.

The sensor node 40, upon notification of the permission of migration, will output that the migration has been granted. For example, the sensor node 40 will display on the LCD 419 the fact that the migration is granted. Otherwise, the sensor node 40 will blink the LED 420 in a blinking pattern corresponding to the permission of migration. The worker thereby may be facilitated to identify the sensor node 40 that can be migrated among a plurality of sensor nodes 40 installed in an environment. Then the worker will migrate the sensor node 40 permitted to migrate (S1045). In this manner the worker may be facilitated to perform solely the on-site operation to migrate the sensor node without keeping in touch with the administrator.

The object manager 101, on the other hand, after notification of the permission of migration, stores "F" in the LUF 1137 of the information selected from within the object list 113 (S1046). Then the object manager 101 will automatically create a new logic node (S1047). Then object manager 101 then will provide the sensor node 40 after having been migrated as the logic node newly created.

More specifically, the object manager 101 will create the information with respect to the new logic node in the object list 113. First, the object manager 101 stores in the LID 1131 of the information on the new logic node a unique value among all of the LID 1131 being set in the appropriate sensor node. Then the object manager 101 stores the MAC address 1134 extracted in the step S1044 into the MAC address 1134 of the information with respect to the new logic node.

Next, the object manager 101 stores "T" in the PUF 1135 of the information with respect to the new logic node. Next, the object manager 101 stores the number of applications which will use the new logic node into the PUC 1136 of the information with respect to the new logic node. Next, the object manager 101 store "T" in the LUF 1137 of the information with respect to the new logic node. Next, the object manager 101 stores the current date and time into the installation date and time 1138 of the information with respect to the new logic node.

In this manner the object manager 101 creates a new logic node. Then it terminates the migration process of the sensor node 40.

By doing this, the application which will use the sensor node in the target location will be prevented to obtain an observation value during the migration work of the sensor node into another new location, allowing the applications which use the sensor node at the original location and the one at the new location to obtain observation values according to its purpose. In addition, the observation value may be obtained from the sensor node continuously except for the time in which the worker actually moves the sensor node.

Figure 21:
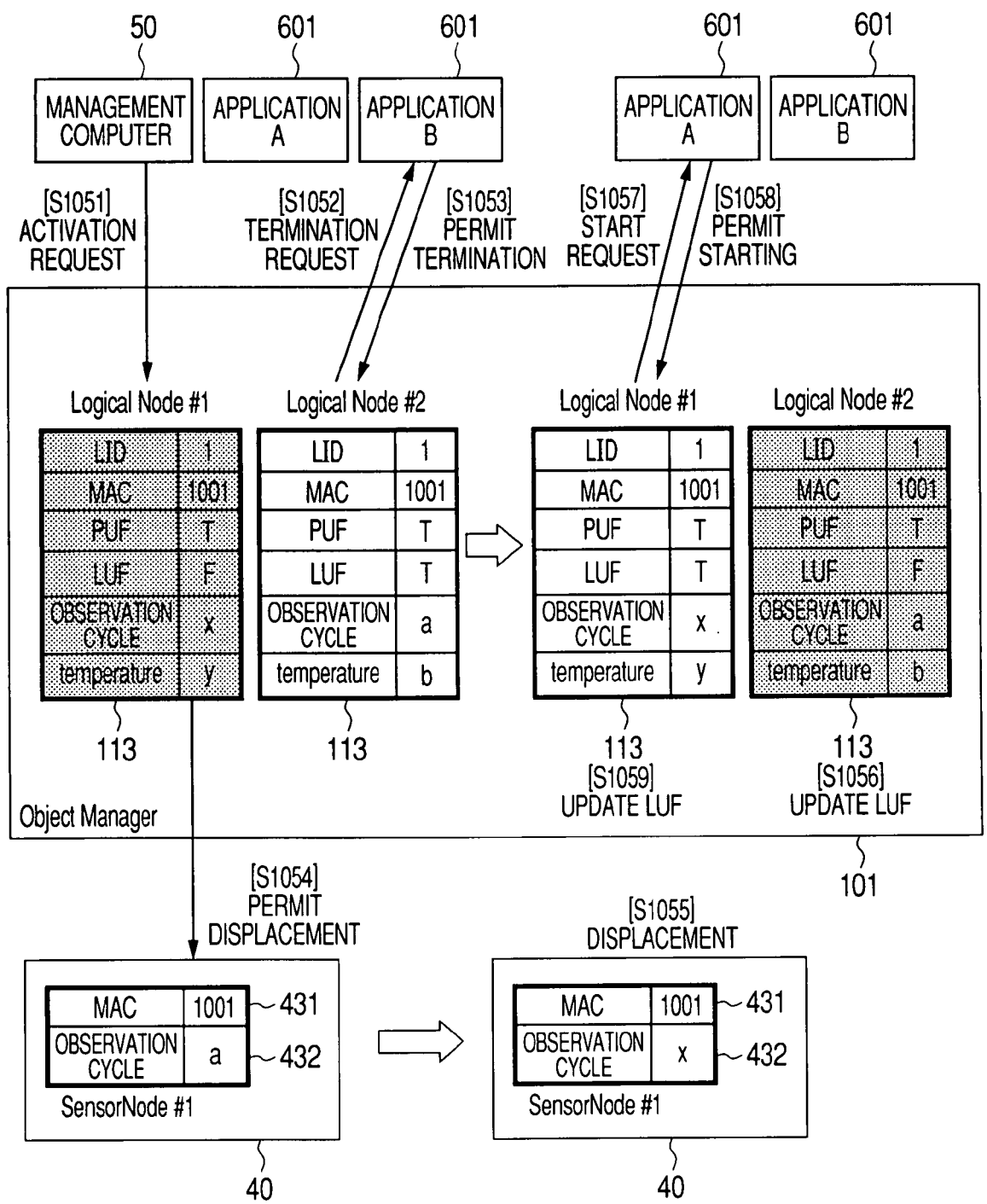
FIG. 21 is a schematic diagram of the process in the sensor net system according to the preferred embodiment of the present invention when a logic node is activated.

FIG. 21 is a schematic diagram of the process in the sensor net system according to the preferred embodiment of the present invention when a logic node is activated.

First, the management computer 50 is triggered by the operation by the administrator to transmit an activation request to the object manager 101 residing on the sensor net server 10 (S105). The activation request includes the LID of the logic node requested to be activated.

The object manager 101 receives the activation request from the management computer 50. Then the object manager 101 selects from within the object list 113 the information in which the LID included in the received activation request matches with the LID 1131 of the object list 113. Next, the object manager 101 extracts the MAC address 1134 of the information selected from the object list 113.

Next, the object manager 101 selects from the object list 113 any information in which the MAC address 1134 thus extracted matches with the MAC address 1134 of the object list 113. Next, the object manager 101 will select the information items in which "T" is stored in the LUF 1137 of the object list 113 (the information with respect to the logic node to be deactivated) from within the information selected from the object list 113. Then the object manager 101 extracts the LID 1131 of the information with respect to the logic node to be deactivated.

Next the object manager 101 requests the termination of use of the logic node identified by the extracted LID 1131 to every applications 601 which are using the appropriate logic node (S1052). The application 601 once requested to terminate using the logic node will terminate the process with respect to the logic node. Thereafter the application 601 will notify the object manager 101 residing on the sensor net server 10 of the permission of termination of use of the logic node (S1053).

When the object manager 101 receives the notification of the permission of termination of use of the logic node from all of the applications 601 which use the appropriate logic node, the logic node will not be used by any of the applications 601. The object manager 101 therefore selects from the object list 113 the information item in which the LID included in the received activation request matches with the LID 1131 of the object list 113 (the information with respect to the logic node to be activated). Then the object manager 101 will extract the MAC address 1134 and the observation cycle 1140 of the information with respect to the logic node to be activated.

Then the object manager 101 will notify the sensor node 40 identified by the MAC address 1134 thus extracted of the permission of migration (S1054). Then the object manager 101 transmits the extracted observation cycle 1140 to the sensor node 40 identified by the extracted MAC address 1134. The sensor node 40 then stores the received observation cycle 1140 into the external storage unit 412.

The sensor node 40, when notified of the permission of migration, will output that the migration is granted. The worker then moves the sensor node 40 granted to migrate to the location corresponding to the logic node requested to be activated (S1055).

On the other hand the object manager 101 which has notified of the permission of migration stores "F" into the LUF 1137 of the information with respect to the logic node to be deactivated (S1056). The logic node set in the same sensor node 40 as the logic node requested to be activated will thereby be deactivated.

Then the object manager 101 requests the commencement of use of the logic node identified by the LID contained in the received activation request to every application 601 which uses the logic node (S1057). The application 601 which is requested to start using the logic node will start processing with respect to the logic node. Then the application 601 notifies the object manager 101 residing on the sensor net server 10 of the permission of start of use of the logic node (S1058).

When the object manager 101 receives the notification of the permission of start of use of the logic node from the application 601, it stores "T" in the LUF 1137 of the information with respect to the logic node to be activated (S1059). The logic node requested to be activated will be activated thereby. Then the activation process of the logic node will terminate.

By performing the activation process as have been described above, a sensor node having been used in another purpose different from the original purpose may be allowed to use for the original purpose. The application using the sensor node in the migration target may be prevented to obtain an observation value during the migration work of the sensor node into the original location, allowing obtaining the observation value according to the purpose by the application using the sensor node at the original location and that at the destination location. In addition, the observation value may be obtained continuously form the sensor node except for the time during which the worker migrates the sensor node.

Figure 22:
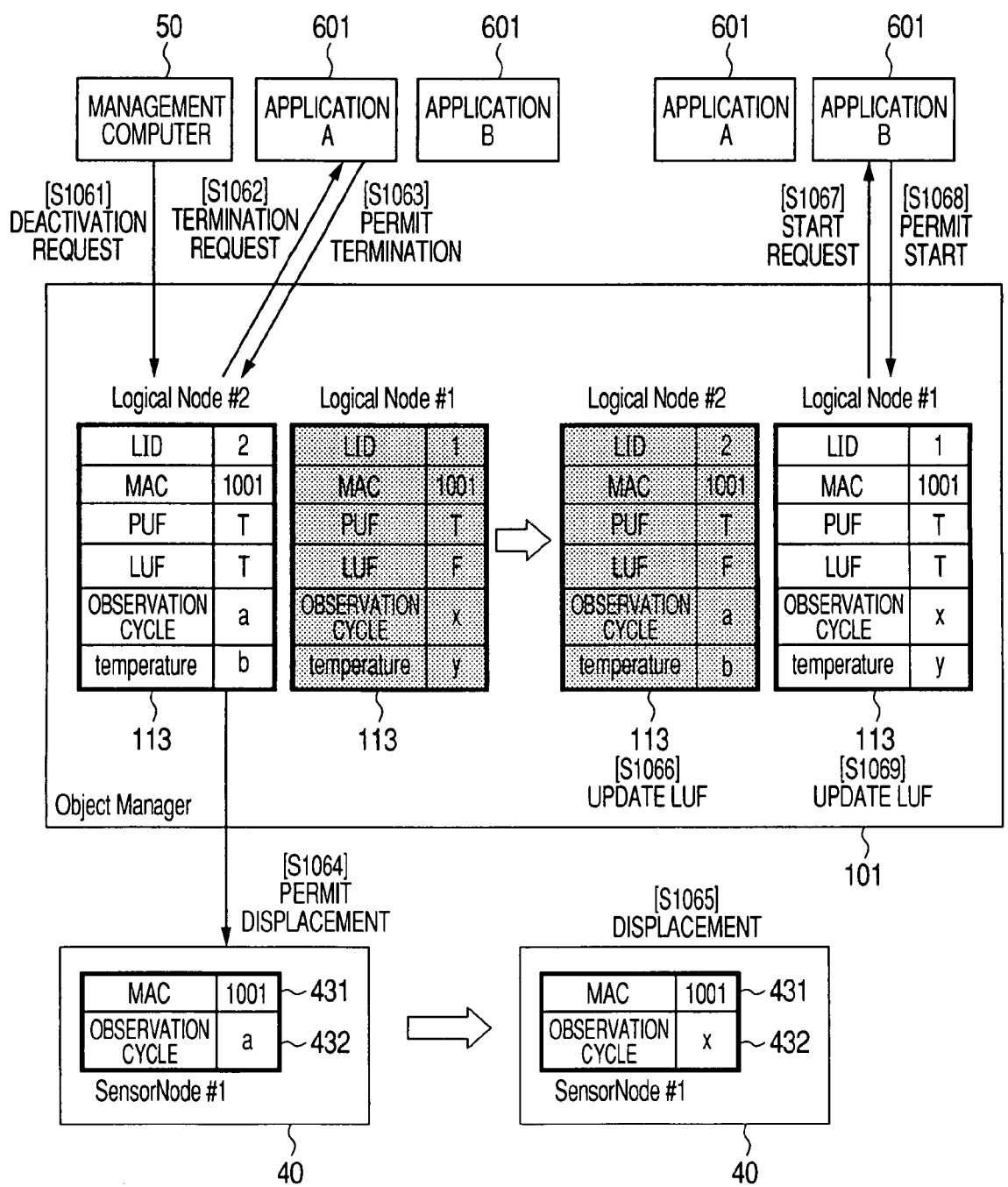
FIG. 22 is a schematic diagram illustrating the process in the sensor net system according to the preferred embodiment of the present invention when a logic node is deactivated.

FIG. 22 is a schematic diagram illustrating the process in the sensor net system according to the preferred embodiment of the present invention when a logic node is deactivated.

First the management computer 50 is triggered by the operation by the administrator to transmit a deactivation request to the object manager 101 residing on the sensor net server 10 (S1061). The deactivation request includes the LID of the logic node requested to be deactivated.

The object manager 101 receives the deactivation request from the management computer 50. Then the object manager 101 requests the termination of use of the logic node identified by the LID 1131 included in the received deactivation request to every application 601 which is using the logic node (S1062). The application 601, when requested with the termination of use of the logic node, will terminate the processing with respect to the logic node. Thereafter the application 601 notifies the object manager 101 residing on the sensor net server 10 of the permission of termination of use of the logic node (S1063).

When the object manager 101 receives the notification of the permission of termination of use of the logic node from all applications 601 which are using the appropriate logic node, the logic node will not be used by those applications 601. Therefore the object manager 101 selects from within the object list 113 the information item in which the LID contained in the received deactivation request matches the LID 1131 of the object list 113 (the information with respect to the logic node to be deactivated). Next, the object manager 101 extracts the MAC address 1134 of the information with respect to the logic node to be deactivated.

Next, the object manager 101 selects from within the object list 113 all information items in which the extracted MAC address 1134 matches with the MAC address 1134 of the object list 113. Then the object manager 101 further selects from within the selected information items from the object list 113 the information items in which "T" is stored in the LUF 1137 of the object list 113 (the information with respect to the logic node to be activated). Next the object manager 101 extracts the MAC address 1134 and the observation cycle 1140 of the information with respect to the logic node to be activated.

Next the object manager 101 notifies the sensor node 40 identified by the extracted MAC address 1134 of the permission of migration (S1064). Then the object manager 101 transmits the extracted observation cycle 1140 to the sensor node 40 identified by the extracted MAC address 1134. Then the sensor node 40 in turn stores the received observation cycle 1140 into the external storage unit 412.

The sensor node 40 will output that the migration is granted when notified of the permission of migration. Then the worker moves the sensor node 40 granted to migrate to the location corresponding to the logic node to be activated (S1065).

On the other hand the object manager 101 which has notified of the permission of migration selects from the object list 113 the information item in which the LID contained in the received deactivation request matches with the LID 1131 of the object list 113 (the information with respect to the logic node to be deactivated). Next the object manager 101 stores "F" into the LUF 1137 of the information with respect to the logic node to be deactivated (S1066). The logic node requested to be deactivated will be deactivated thereby.

Next, the object manager 101 extracts the LID 1131 of the information with respect to the logic node to be activated. Next, the object manager 101 requests the start of use of the logic node identified by the extracted LID 1131 to every application 601 which will use the appropriate logic node (S1067). The application 601 which has requested the start of use of the logic node will start processing on the logic node. Thereafter the application 601 notifies the object manager 101 residing on the sensor net server 10 of the permission of start of use of the logic node (S1068).

When the object manager 101 receives the notification of the permission of start of use of the logic node from the application 601, it stores "T" into the LUF 1137 of the information with respect to the logic node to be activated (S1069). The logic node configured in the same sensor node 40 as the logic node requested to be deactivated will be activated thereby. Then the deactivation process of the logic node will terminate.

By performing the deactivation process as have been described above, the sensor node having been used in a different purpose from the original purpose may be used for the original purpose. The application which uses the sensor node in the destination location also is prevented to obtain an observation value during the migration of the sensor node to the original location, allowing the application which uses the sensor node at the original location and at the destination location may obtain the observation value according to the purpose specified. In addition, the observation value may be obtained from the sensor node continuously, except for the time period during which the worker displaces the sensor node.

Figure 23:
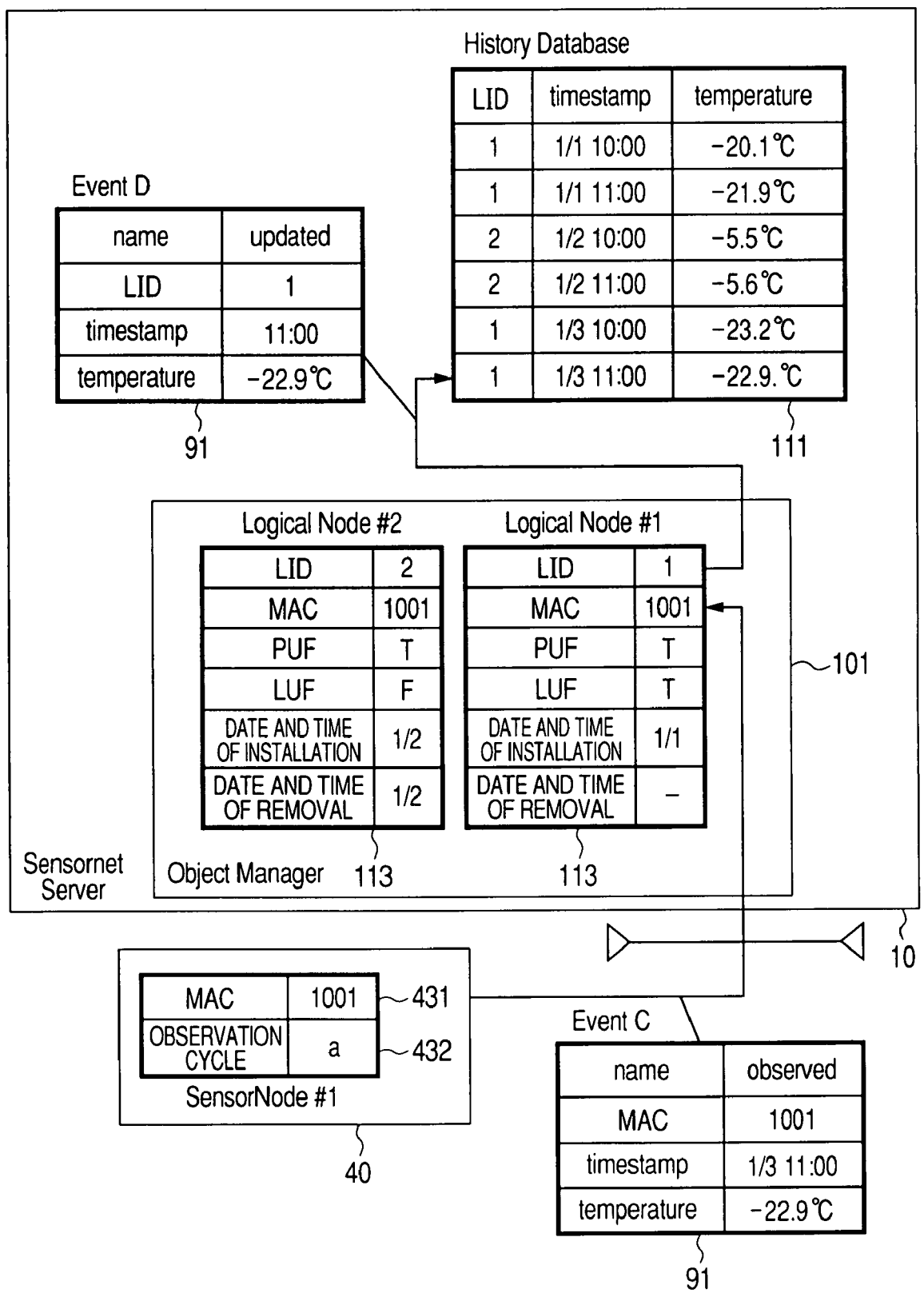
FIG. 23 is a schematic diagram illustrating the process of the sensor net server according to the preferred embodiment of the present invention when a sensor node is migrated.

FIG. 23 is a schematic diagram illustrating the process of the sensor net system according to the preferred embodiment of the present invention when a sensor node 40 is migrated.

In the figure, the object manager 101 residing on the sensor net server 10 provides the sensor node 40 identified by the "1001" of the MAC address as the logic node identified by the "1" of LID since January 1st.

Then the sensor node 40 measures the environment information in every observation cycle 432 configured. Then the sensor node 40 transmits the measured environment information to the sensor net server 10 as the event C 91.

The sensor net server 10 receives the event C 91 from the sensor node. Then the object manager 101 residing on the sensor net server 10 selects from within the object list 113 all information items in which the MAC address 912 of the received event C 91 matches with the MAC address 1134 of the object list 113.

Then the object manager 101 selects from within the information items selected from the object list 113 the information item in which "T" is stored in the LUF 1137 of the object list 113.

Then the object manager 101 updates the observation information included in the information selected from the object list 113.

Next, the object manager 101 creates an event D 91 based on the received event C 91 and the information selected from the object list 113. More specifically, the object manager 101 will change "observed" stored in the name of event 911 of the event C 91 to "update" indicating the updated information. In addition, the object manager 101 changes "1001" of the MAC address 912 of the event C 91 to "1" of the LID 1131 of the information selected from the object list 113.

By doing this the object manager 101 creates an event D 91. The event D 91 includes the LID 917 instead of the MAC address 912. The LID 917 is a unique identifier of the logic node having observed the environment information corresponding to the event D 91.

Then the object manager 101 transmits thus created event D 91 to the event issuing unit 104. The event issuing unit 104 in turn transfers the received event D 91 to the RDB manager 103.

The RDB manager 103 updates the history database 111 based on the received event D 91. In other words the RDB manager 103 stores the environment information observed by the sensor node 40 into the history database 111 as the environment information observed by the logic node identified by the "1" of LID.

Now assuming the sensor node 40 identified by "1001" of the MAC address is moved on January 2nd. In this case the object manager 101 residing on the sensor net server 10 provides the sensor node 40 identified by the "1001" of the MAC address as a logic node identified by the "2" of LID.

Then the object manager 101 will create event D 91 by changing the "1001" of the MAC address 912 of the event C 91 to "2" of the LID 1131 of the information selected from the object list 113.

By doing this the RDB manager 103 stores the environment information observed by the sensor node 40 into the history database 111 as the environment information observed by the logic node identified by the "2" of LID.

It is further assumed that the sensor node 40 having been moved is moved back to the original location on January 3rd.

Then the object manager 101 residing on the sensor net server 10 will deactivates the logic node identified by the "2" of LID, while activating the logic node identified by the "1" of LID. The object manager 101 thereby provides the sensor node 40 identified by the "1001" of MAC address as the logic node identified by the "1" of LID.

The object manager 101 then creates the event D 91 by changing from "1001" of the MAC address 912 of the event C 91 to "1" of the LID 1131 of the information selected from the object list 113.

By doing this the RDB manager 103 stores the environment information observed by the sensor node 40 into the history database 111 as the environment information observed by the logic node identified by the "1" of LID.

As can be appreciated from the foregoing description, the object manager 101 may provide to the application 601 and the RDB manager 103 the environment information observed before migration of the sensor node 40 distinguished separately from the environment information observed after the migration of the sensor node 40.

Figure 24A:
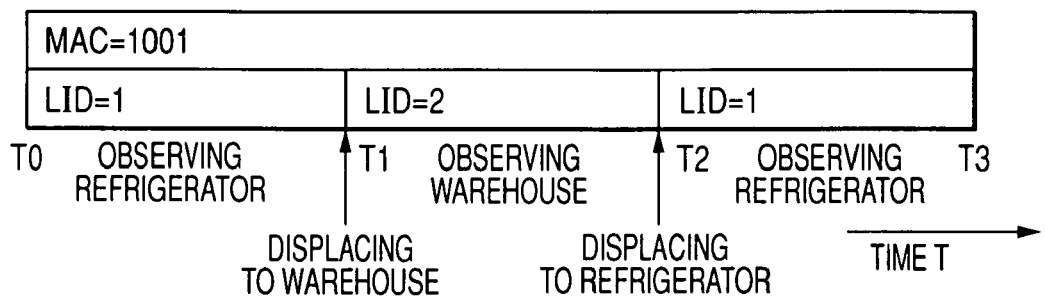
FIG. 24A is a schematic diagram illustrating the transition of LID during migration of the sensor node according to the preferred embodiment of the present invention.
Figure 24B:
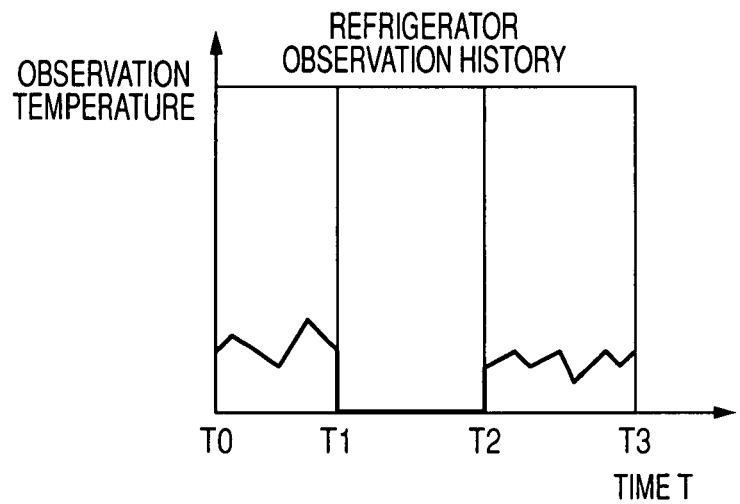
FIG. 24B is a graph illustrating the observation history of the temperature in the refrigerator according to the preferred embodiment of the present invention.
Figure 24C:
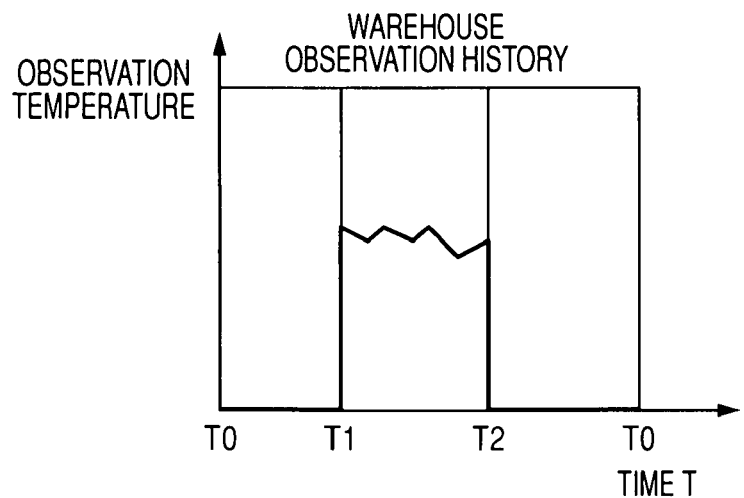
FIG. 24C is a graph illustrating the observation history of the temperature in the warehouse according to the preferred embodiment of the present invention.

FIG. 24A is a schematic diagram illustrating the transition of LID during migration of the sensor node 40 according to the preferred embodiment of the present invention. FIG. 24B is a graph illustrating the observation history of the temperature in the refrigerator according to the preferred embodiment of the present invention. FIG. 24C is a graph illustrating the observation history of the temperature in the warehouse according to the preferred embodiment of the present invention.

The sensor node 40 identified by "1001" of the MAC address is usually installed in the refrigerator. In other words the sensor node 40 observes the temperature in the refrigerator. In this case the object manager 101 residing on the sensor net server 10 provides the sensor node 40 identified by the "1001" of MAC address as the logic node identified by the "1" of LID. In other words the logic node identified by the "1" of LID is for observing the temperature in the refrigerator. Because of this the temperature observed by the sensor node 40 is stored in the history database 111 as the temperature in the refrigerator.

Now assuming the sensor node 40 is moved to the warehouse at the time T1. In other words the sensor node 40 now observes the temperature in the warehouse. Then the object manager 101 residing on the sensor net server 10 provides the sensor node 40 identified by the "1001" of MAC address as the logic node identified by the "2" of LID. In other words the logic node identified by the "2" of LID is for observing the temperature in the warehouse. Because of this the temperature observed by the sensor node 40 is stored as the temperature in the warehouse in the history database 111.

It is assumed that the sensor node 40 is moved back to the refrigerator at the time T2. In other words, the sensor node 40 now measures the temperature of the refrigerator. Then the object manager 101 residing on the sensor net server 10 provided the sensor node 40 identified by the "1001" of MAC address as the logic node identified by the "1" of LID. Because of this the temperature observed by the sensor node 40 is stored in the history database 111 as the temperature in the refrigerator.

FIG. 24B illustrates as a graph the temperature of refrigerator stored in the history database 111. According to the graph shown in FIG. 24B, the temperature observed by the sensor node 40 from the time T0 to the time T1 as well as from the time T2 to the time T3 is stored as the temperature of the refrigerator.

FIG. 24C illustrates as a graph the temperature of warehouse stored in the history database 111. According to the graph shown in FIG. 24C, the temperature observed by the sensor node 40 from the time T1 to the time T2 is stored as the temperature of warehouse in the history database 111.

As can be appreciated from the foregoing description, the object manager 101 may provided the environment information observed by one single sensor node 40 for each location of the one single sensor node 40 separately.

Figure 25:
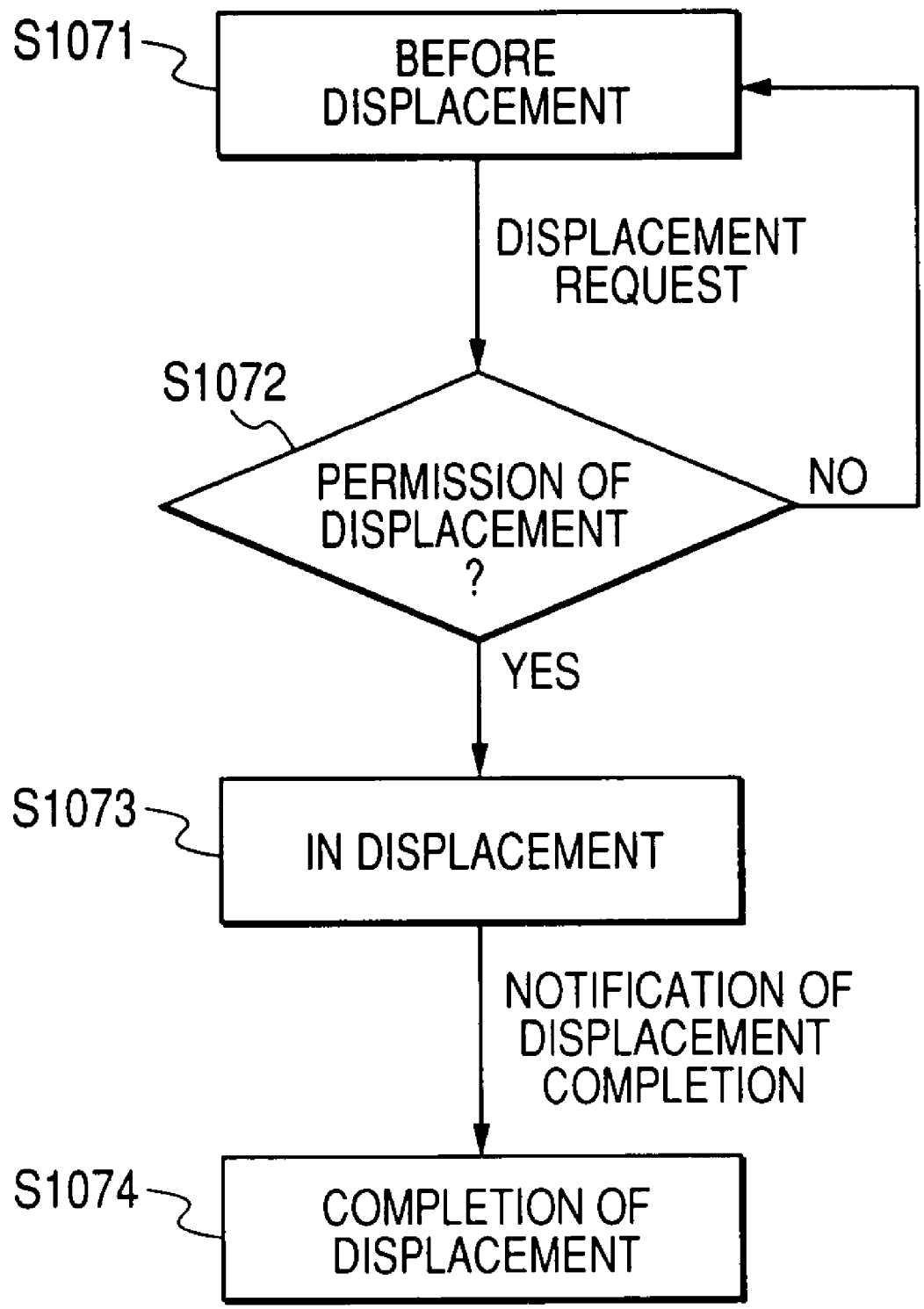
FIG. 25 is a flowchart illustrating the migration procedure of the sensor node by a worker according to the preferred embodiment of the present invention.

FIG. 25 is a flowchart illustrating the migration procedure of the sensor node 40 by a worker according to the preferred embodiment of the present invention.

In the process described with reference to FIG. 20, the management computer 50 transmitted the migration request to the sensor net server 10. However the sensor node 40 may transmits the migration request to the sensor net server 10 instead of the management computer 50.

The sensor node 40 measures the environment information at the predetermined observation cycle and transmits the environment information thus observed to the sensor net server 10 before migration (S1071). Then the worker presses the buttons 418 provided on the sensor node 40 to be migrated. Then the sensor node 40 will transmit a migration request to the object manager 101 residing on the sensor net server 10.

The object manager 101 upon reception of the migration request performs the steps S1042, step S1043, and step S1044 of the process described with reference to FIG. 20.

The sensor node 40 determines whether or not the migration is granted (S1072). If the migration is not granted then the sensor node 40 proceeds back to the process before migration in step S1071.

If the migration is granted, on the other hand, the sensor node 40 will output that the migration is granted. For example, the sensor node 40 displays on the LCD 419 that the migration is granted. Otherwise the sensor node 40 blinks the LED 420 in a blinking pattern corresponding to the permission of migration. Then the worker starts migrating the sensor node 40 permitted to migrate (S1073).

The worker installs the sensor node 40 at the destination location and presses the buttons 418 provided on the sensor node 40. Then the sensor node 40 notifies the completion of migration to the object manager 101 residing on the sensor net server 10.

In this manner the migration of the sensor node 40 is complete (S1074).

Figure 26:
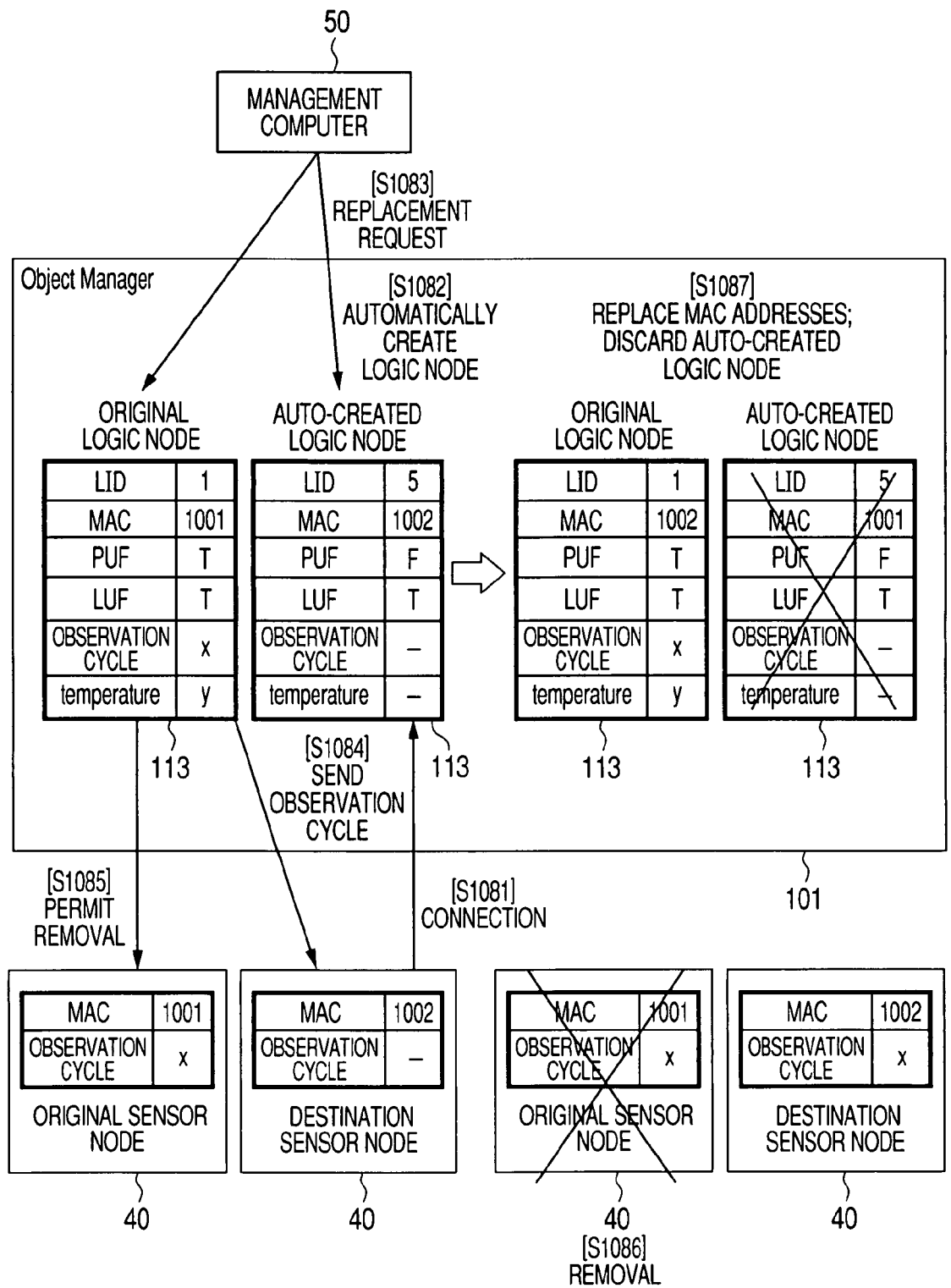
FIG. 26 is a schematic diagram illustrating the process performed in the sensor net system according to the preferred embodiment of the present invention when the sensor node is replaced.

FIG. 26 is a schematic diagram illustrating the process performed in the sensor net system according to the preferred embodiment of the present invention when the sensor node 40 is replaced. In this preferred embodiment a newly configured sensor node is described which is to be the replaced sensor node a priori. In other words, as will be described with reference to FIG. 28, when replacing the sensor node, the sensor node corresponding to the disused logic node indicating "F" in the PUF 1135 and "T" in the LUF 1137 is selected as the primary candidate of the destination sensor node of replacement, however the preferred embodiment describes when a sensor node newly configured is used as the destination sensor node of replacement.

In the description, the sensor node 40 (replaced sensor node) identified by the "1001" of MAC address is described as being replaced with a sensor node (replacing sensor node) identified by the "1002" of MAC address.

Now the replacing sensor node 40 is connected to the sensor net server 10 through the PAN (S108). Then the replacing sensor node 40 transmits to the sensor net server 10 an event 91 including the MAC address 431 stored in its external storage unit 412. The sensor net server 10 receives the event 91 from the replacing sensor node 40. Then the object manager 101 residing on the sensor net server 10 refers to the received event 91 to automatically create a new logic node preconfigured for the replacing sensor node 40 (S1082).

Figure 27:
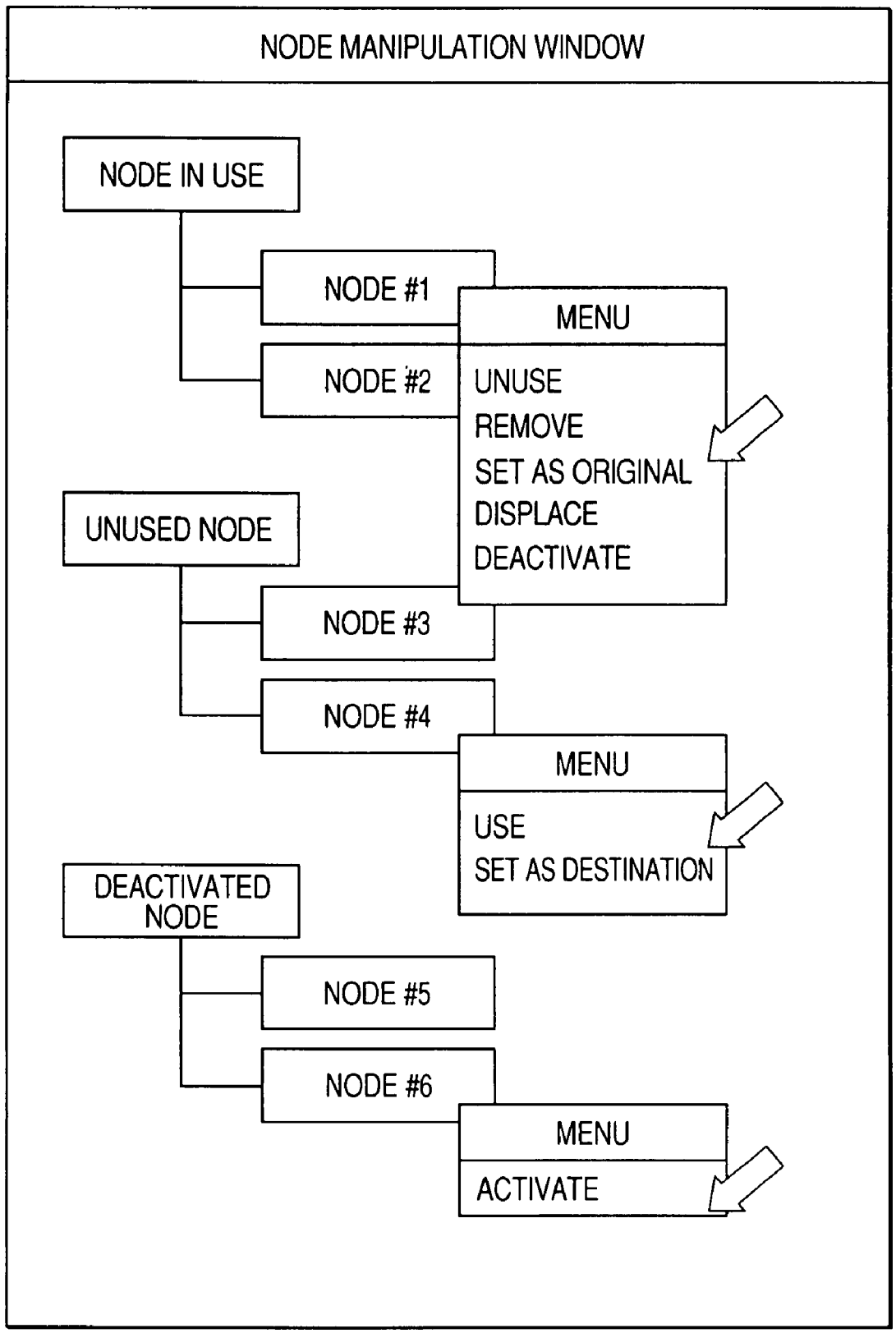
FIG. 27 is a schematic diagram illustrating a typical example of node operation display displayed on the management computer according to the preferred embodiment of the present invention.

More specifically, the object manager 101 creates in the object list 113 the information item with respect to the new logic node. First, the object manager 101 stores in the LID 1131 of the information with respect to the new logic node a unique value which is different from every LID 1131 set in the newly connected sensor node. In FIG. 27 a value "5" is store however this is merely a typical example and any unique value different from every LID 1131 may be used. Next, the object manager 101 stores the MAC address 912 included in the received event 91 into the MAC address 1134 of the information with respect to the new logic node.

Next, the object manager 101 stores "F" in the PUF 1135 of the information on the new logic node. Then the object manager 101 stores "0" in the PUC 1136 of the information on the new logic node. Next, the object manager 101 stores "T" in the LUF 1137 of the information on the new logic node. Then the object manager 101 stores the current date and time in the installation date and time 1138 of the information on the new logic node.

In this manner the object manager 101 creates a new logic node (auto-created logic node).

Next, the management computer 50 is triggered by the operation by the administrator to transmit a replacement request to the object manager 101 residing on the sensor net server 10 (S1083). The replacement request includes the LID of the logic node to be replaced (replaced logic node) and the LID of the logic node to replace (replacing logic node). In the figure the replacing logic node is the auto-created logic node created in step S1082.

The object manager 101 receives the replacement request from the management computer 50. Then the object manager 101 extracts the LID of the replaced logic node and the LID of the replacing logic node from the replacement request.

Next, the object manager 101 selects from the object list 113 the information item (information with respect to the replaced logic node) in which the LID of the extracted LID of the replaced logic node matches with the LID 1131 of the object list 113. Next the object manager 101 extracts the observation cycle 1140 of the selected information on the replaced logic node. Next, the object manager 101 selects from the object list 113 the information item (the information on the replacing logic node) in which the extracted LID of the replacing logic node matches with the LID 1131 of the object list 113. Next, the object manager 101 extracts the MAC address 1134 of the selected information on the replacing logic node.

Next, the object manager 101 transmits thus extracted observation cycle 1140 to the sensor node 40 identified by the extracted MAC address 1134. In other words the object manager 101 transmits the extracted observation cycle 1140 to the replacing sensor node 40 (S1084).

The replacing sensor node 40 receives the observation cycle 1140 from the object manager 101. Then the replacing sensor node 40 stores the received observation cycle 1140 into its external storage unit 412. The sensor node 40 thereby is capable of observe the environment information for every observation cycle 432 stored in the external storage unit 412.

The object manager 101 on the other hand, after transmitting the observation cycle 1140, extracts the MAC address 1134 of the selected information item on the replaced logic node. Next, the object manager 101 notifies the sensor node 40 identified by the extracted MAC address 1134 of the permission of removal. The object manager 101 namely notifies the replaced sensor node 40 of the permission of removal (S1085).

The replaced sensor node 40, upon notification of the permission of removal, will output that the removal is granted. For example, the sensor node 40 displays on the LCD 419 that the removal is granted. Otherwise the sensor node 40 subject to be replaced blinks the LED 420 in the blinking pattern corresponding to the permission of removal. The worker thereby is facilitated to find the sensor node 40 subject to be replaced among a plurality of sensor nodes 40 installed in an environment, furthermore he or she may be helped to determine when the sensor node subject to be replaced is to be removed. Then the worker removes the replaced sensor node 40 having the removal granted (S1086). In this manner the worker is allowed to replace sensor nodes by performing solely the on-site operation without keeping in touch with the administrator.

On the other hand the object manager 101 after notifying the removal permission replaces the MAC address 1134 of the selected information item on the replaced logic node with the MAC address 1134 of the selected information item on the replacing logic node. Then the object manager 101 deletes from the object list 113 the selected information on the replacing logic node. By doing this the object manager 101 may discard the auto-created logic node (S1087). Then the replacement process of the sensor node 40 terminates.

As can be appreciated from the foregoing description, when a sensor node 40 is replaced, the object manager 101 changes the correspondence between the LID of the logic node and the MAC address of the sensor node 40. Because of this the application 601 residing on the client computer 60 may continue to process without recognizing the replacement of the sensor node 40.

Since the replacing sensor node may be operated with the same configuration as the replaced sensor node, the sensor nodes may be replaced by running both the replaced sensor node and the replacing sensor node without discontinuing the observation values.

Figure 30A:
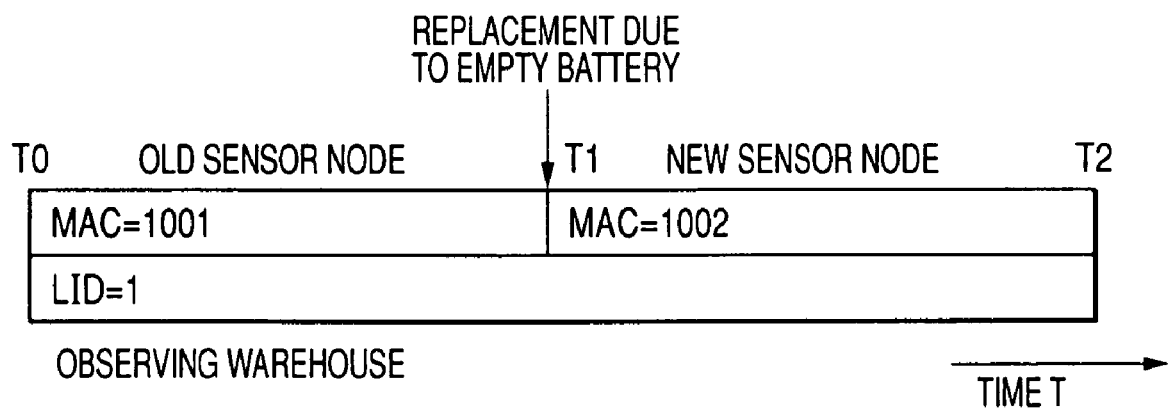
FIG. 30A is a schematic diagram illustrating the transition of MAC address according to the preferred embodiment of the present invention when the sensor node is replaced.
Figure 30B:
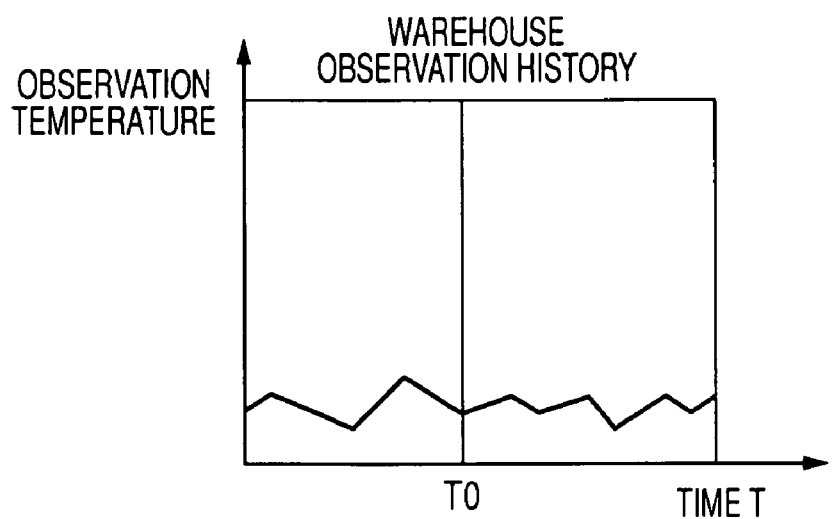
FIG. 30B is a graph illustrating the observation history of the temperature in the warehouse according to the preferred embodiment of the present invention.

FIG. 30A is a schematic diagram illustrating the transition of MAC address according to the preferred embodiment of the present invention when the sensor node 40 is replaced. FIG. 30B is a graph illustrating the observation history of the temperature in the warehouse according to the preferred embodiment of the present invention.

The sensor node 40 identified by the "1001" of MAC address is placed in the warehouse from the time T0 to the time T1. The sensor node 40, in other words observes the temperature in the warehouse. Then the object manager 101 residing on the sensor net server 10 provides the sensor node 40 identified by the "1001" of MAC address as the logic node identified by the "1" of LID. In other words the logic node identified by the "1" of LID is for observing the temperature of warehouse.

In this configuration the temperature observed by the sensor node 40 identified by the "1001" of MAC address from the time T0 to the time T1 is stored in the history database 111 as the temperature in the warehouse.

Now assuming that the sensor node 40 identified by the "1001" of MAC address is to be replaced due to the battery which is about to be emptied. Then the sensor node 40 identified by the "1001" of MAC address is further assumed to be replaced at the time T1 with a sensor node 40 identified by the "1002" of MAC address.

In this case the sensor node 40 identified by the "1002" of MAC address will be installed in the warehouse during the period of time from the time T1 to the time T2. The sensor node 40 in other words observes the temperature in the warehouse. The object manager 101 residing on the sensor net server 10 in this situation provides the sensor node 40 identified by the "1002" of MAC address as the logic node identified by "1" of LID.

Because of this the temperature observed by the sensor node 40 identified by the "1002" of MAC address is to be stored in the history database 111 as the temperature of warehouse during the period from the time T1 to the time T2.

FIG. 30B is a graph of the temperature of the warehouse stored in the history database 111. According to the graph shown in FIG. 30B, the temperature observed by the sensor node 40 identified by the "1001" of MAC address during the period from the time T0 to the time T1 is stored as the temperature of the warehouse in the history database 111. In addition, the temperature observed by the sensor node 40 identified by the "1002" of MAC address during the period from time T1 to the time T2 is stored as the temperature of the warehouse in the history database 111.

In this manner the object manager 101 morpheme analysis provides the environment information observed by two sensor nodes 40 as the environment information as if only one single sensor node 40 observes. The object manager 101 thereby may prevent the application 601 residing on the client computer 60 from recognizing the replacement of the sensor node 40.

FIG. 27 is a schematic diagram illustrating a typical example of node operation display displayed on the management computer 50 according to the preferred embodiment of the present invention.

On the node operation display each logic node is labeled as in use, not used, or deactivated. The logic node in use has "T" in PUF and "T" in LUF. Thus the sensor node 40 provided as the logic node in use is present and is being used by the application.

The logic node disused has "F" in PUF and "T" in LUF. Thus the sensor node 40 provided as disused logic node may be present but is not being used by the application.

The deactivated logic node has "T" in PUF and "F" in LUF. More specifically the sensor node 40 having a deactivated logic node configured is being used in another purpose for the moment.

The administrator may use the node operation display to instruct to the logic node in use to change the status to disused, to remove, to migrate, or to deactivate.

If the change to disused or the removal is instructed then the management computer 50 transmits a disuse request to the object manager 101 residing on the sensor net server 10. If the migration is instructed then the management computer 50 transmits a migration request to the object manager 101 residing on the sensor net server 10. Otherwise if deactivation is instructed then the management computer 50 transmits a deactivation request to the object manager 101 residing on the sensor net server 10.

In addition, the administrator may instruct to the disused logic node to change the status to "used". If the change to "used" is instructed then the management computer 50 transmits a use request to the object manager 101 residing on the sensor net server 10.

Furthermore the administrator may specify a logic node in use as the one replaced and a logic node disused as the replacing one. If a logic node in use is specified as the replaced logic node and the disused logic node is specified as the replacing logic node, then the management computer 50 transmits a replacement request to the object manager 101 residing on the sensor net server 10.

Additionally the administrator may instruct to the deactivated node to be activated. If the activation is specified then the management computer 50 transmits an activation request to the object manager 101 residing on the sensor net server 10.

In this manner the administrator is helped to instruct the migration and replacement of a sensor node by the simple operation. It should be noted that the sensor node operation display is not to be limited by the preferred embodiment, the display may be such that each sensor node is corresponding to its status (used, disused, etc.) and a user is allowed to manipulate the status of each node.

FIG. 28 is a schematic diagram of the sequence performed in the sensor net system according to the preferred embodiment of the present invention when a sensor node 40 is replaced.

The management computer 50 is triggered by the operation by the administrator to transmit a replacement request to the sensor net server 10 (S1101). The replacement request includes the LID of the logic node subject to be replaced (replaced logic node).

The sensor net server 10 receives the replacement request from the management computer 50. Then the sensor net server 10 extracts the LID of the replaced logic node from within the received replacement request. Next, the sensor net server 10 determines the logic node identified by the extracted LID of the replaced logic node as the replaced logic node (S1102).

The sensor net server 10 then refers to the object list 113 to find a logic node which is the candidate of the replacing logic node (S1103). As have been described above with reference to FIG. 26, a newly connected sensor node may be selected.

For example, the sensor net server 10 selects from the object list 113 the information item in which "F" is stored in the PUF 1135 of the object list 113 and "T" is stored in the LUF 1135 of the object list 113 (the information with respect to the disused logic node). The sensor net server 10 then extracts the LID 1131 and the logic node name 1132 of the selected information item with respect to the disused logic node. Then the sensor net server 10 uses the logic node identified by the extracted LID 1131 as the candidate of the replacing node.

Next, the sensor net server 10 transmits the extracted LID 1131 and the logic node name 1132 to the management computer 50. The sensor net server 10 thereby notifies the management computer 50 of the logic node candidate to the replacing node (S1104). Then the sensor net server 10 may notify the management computer 50 of all candidates of replacing nodes, or may notify it of a limited, predetermined number of replacing candidates. For example, By previously finding the location of sensor nodes, the replacing candidate nearest to the replaced sensor node may be selected to notify the management computer. The management computer 50 displays the received logic node name 1132. The administrator will then select a logic node to be the replacing node among the logic node candidates to the replacing nodes. The management computer 50 then transmits the replacing node destination determination request including the LID of the logic node selected by the administrator to the sensor net server 10 (S1105).

The sensor net server 10 receives the destination determination request from the management computer 50. Next, the sensor net server 10 selects the information item in which the LID included in the received destination determination request matches with the LID 1131 of the object list 113 (information with respect to the destination logic node) from within the object list 113. The object manager 101 then extracts the MAC address 1134 of the information with respect to the selected destination logic node.

Next, the sensor net server 10 selects the information item in which the LID included in the replacement request received in the step S1101 matches with the LID 1131 of the object list 113 (the information with respect to the replaced logic node) from within the object list 113. Then the object manager 101 extracts the observation cycle 1140 of the selected information with respect to the replaced logic node (S1106).

Next, the object manager 101 transmits the extracted observation cycle 1140 to the sensor node 40 identified by the extracted MAC address 1134. In other words the object manager 101 transmits the extracted observation cycle 1140 to the replacing sensor node 40 (S1107).

The replacing sensor node 40, receives the observation cycle 1140 from the object manager 101. Then the replacing sensor node 40 stores the received observation cycle 1140 into the external storage unit 412.

The object manager 101, on the other hand, after transmitting the observation cycle 1140, extracts the MAC address 1134 of the selected information with respect to the replaced logic node. Next, the object manager 101 notifies the sensor node 40 identified by the extracted MAC address 1134 of the permission of removal. In other words the object manager 101 notifies the replaced logic node 40 of the permission of removal (S108). The replaced sensor node 40 after having been notified of the permission of removal, outputs that the removal is granted. Then the worker stops the power supply of the replaced sensor node 40 (S1109). Otherwise the replaced sensor node may autonomously shut down.

On the other hand the object manager 101 having notified of the permission of removal replaces the MAC address 1134 of the selected information with respect to the replaced logic node with the MAC address 1134 of the selected information with respect to the replacing logic node (S1110). The object manager 101 thereafter deletes the selected information item with respect to the replacing logic node from the object list 113.

The object manager 101 then notifies the management computer of the completion of replacement of the sensor node 40 (S1111). The replacement of the sensor node 40 is thereby complete.

FIG. 29 is a schematic diagram illustrating the sequence performed by the sensor net system according to the preferred embodiment of the present invention when a sensor node 40A is replaced.

In the process steps described with reference to FIG. 28, the management computer 50 transmits the replacement request to the sensor net server 10. However, the sensor node 40A may also transmits the replacement request to the sensor net server 10 instead of the management computer 50.

The sensor node 40A subject to be replaced, prior to replacement measures the environment information at the predefined observation cycle and transmits the observed environment information to the sensor net server 10. Then the worker pushes the button 418 equipped on the replaced sensor node 40A. The replaced sensor node 40A then transmits the replacement request including the MAC address of the replaced sensor node 40A to the sensor net server 10 (S1131).

The sensor net server 10 receives the replacement request from the replaced sensor node 40A. The sensor net server 10 then extracts the MAC address from within the received replacement request. Next, the sensor net server 10 decides the sensor node 40A identified by the extracted MAC address as the sensor node 40A to be replaced (S1132).

Next, the sensor net server 10 refers to the object list 113 to find a sensor node 40B,40C which is the candidate of the replacing node (S1133).

For example, the sensor net server 10 select one information item in which "F" is stored in the PUF 1135 of the object list 113 and "T" is stored in the LUF 1135 of the object list 113 (the information with respect to the disused logic node) from the object list 113. Then the sensor net server 10 extracts the MAC address 1134 of the selected information with respect to the disused logic node. Thereafter the sensor net server 10 selects the sensor node 40C identified by the extracted MAC address 1134 as the candidate of replacing node.

Next, the sensor net server 10 notifies the replacing candidate sensor node 40C found so that it is the definitive replacing sensor node. Then the replacing candidate sensor node 40C outputs that it becomes the candidate of replacing node.

In addition, the sensor net server 10 notifies the replaced sensor node 40A of the name of the replacing candidate sensor node 40C (1134). Then the sensor node 40A outputs the notified name of the replacing candidate sensor node 40C. Otherwise the LED 420 provided on the replaced sensor node 40A and the LED 420 provided on the replacing candidate sensor node 40B,40C may blink in synchronism. The worker may be facilitated to find the replacing candidate sensor node 40C out of a plurality of sensor node 40B,40C installed in the environment. The worker then decides whether or not the replacing candidate sensor node 40B,40C may be the definitive destination.

Now assumes that the worker decides that the replacing candidate sensor node 40C is not for the destination. The worker then pushes the button 418 provided on the replaced sensor node 40A. The replaced sensor node 40A in turn transmits a finding next candidate request to the sensor net server 10 (S1135).

The sensor net server 10 receives the finding next candidate request from the replaced sensor node 40A.

The sensor net server 10 then refers to the object list 113 to find a sensor node 40 which may be the secondary candidate of the replacing destination (S1136). In this example the sensor net server 10 find a sensor node 40B which will be the candidate of replacing destination among the sensor nodes 40B,40C except for the sensor node 40C found in the step S1133.

Next the sensor net server 10 notifies the found replacing candidate sensor node 40B that it is the replacing destination. Furthermore, the sensor net server 10 notifies the replaced sensor node 40A of the name of the replacing candidate sensor node 40B (1137). Then, the worker decides whether or not the replacing candidate sensor node 40B may be the definitive destination.

Now, the worker decides that the replacing candidate sensor node 40B is the destination. The worker then presses the buttons 418 provided on the replaced sensor node 40A. The replaced sensor node 40A in turn transmits the replacement destination determination request to the sensor net server 10 (S1138).

The sensor net server 10 receives the replacement destination determination request from the sensor node 40A subject to be replaced. The sensor net server 10 then selects from the object list 113 the information items in which the MAC address of the sensor node 40A subject to be replaced matches with the MAC address 1134 of the object list 113. Next the sensor net server 10 further selects from within the information items selected from the object list 113, the information item in which "T" is stored in the PUF 1135 of the object list 113 and "T" is stored in the LUF 1137 of the object list 113 (the information with respect to the replaced logic node). The object manager 101 then extracts the observation cycle 1140 of the selected information item with respect to the replaced logic node (S1139).

Next, the object manager 101 transmits the extracted observation cycle 1140 to the replacing sensor node 40B (S1140). The replacing sensor node 40B then receives the observation cycle 1140 from the object manager 101. The replacing sensor node 40B then stores the received observation cycle 1140 into the external storage unit 412.

On the other hand the object manager 101 which has sent the observation cycle 1140 notifies the replaced sensor node 40A of the permission of removal (S1141). The replaced sensor node 40A when notified of the permission of removal outputs that the removal is granted. Then the worker stops the power of the replaced sensor node 40A (S1142).

On the other hand the object manager 101, having notified of the permission of removal, selects from the object list 113 the information item in which the MAC address of the replacing sensor node 40B matches with the MAC address 1134 of the object list 113. Next, the sensor net server 10 selects from within the information items selected from the object list 113, the information item in which "T" is stored in the PUF 1135 of the object list 113 and "T" is stored in the LUF 1137 of the object list 113 (the information with respect to the replacing logic node). Next, the object manager 101 replaces the MAC address 1134 of the selected information with respect to the replaced logic node with the MAC address 1134 of the selected information with respect to the replacing logic node (S1143). Next the sensor net server 10 deletes the selected information item with respect to the replacing logic node from the object list 113. By doing this the replacement of the sensor node 40A is complete.

As can be appreciated from the foregoing description, the worker may press the button 418 provided on the sensor node 40A to replace the sensor node 40A. In other words the replacement of the sensor node 40A is achieved by only the on-site worker without the administrator operating the management computer 50, allowing the replaced sensor node and the replacing sensor node to be specified, as well as allowing the worker to determine when to remove the replaced sensor node.

What is claimed is:

1. A sensor net server connected to a management computer, a client computer, and a plurality of sensor nodes, comprising:
    a processing unit for configuring a logic node for a connected one of said plurality of sensor nodes; and
    a storage unit for storing said logic node provided with physical node use information indicating whether or not said connected sensor node is in use, and logic node use information indicating whether or not said sensor node is provided as said logic node,
    wherein, when a replacement request of said sensor node is received, said processing unit specifies the sensor node to be replaced from said replacement request, selects a sensor node configured as the logic node which is provided with the physical node use information indicating that said sensor node is not in use and the logic node use information indicating said sensor node is provided as a logic node from said storage unit, specifies said selected sensor node as the destination replacing sensor node in order to replace said replaced sensor node with said replacing sensor node,
    wherein said processing unit specifies the logic node of the replaced sensor node based on said replacement request, and outputs the configuration information of said replaced sensor node provided in said specified logic node to said replacing sensor node,
    wherein said processing unit, after having output the configuration information of said replaced sensor node, puts a MAC address of the logic node of said replaced sensor node to a MAC address of the logic node of said replacing sensor node in order to delete the logic node of said replacing sensor node, and
    wherein the management computer transmits various requests to the sensor net server, and the client computer performs various processing based on environment information measured by the sensor nodes.

2. The sensor net server according to claim 1,
    wherein said processing unit transfers to either of said management computer or client computer an event received from said sensor node when said physical node use information provided in said logic node indicates that said sensor node is in use.

3. The sensor net server according to claim 1,
    wherein, when a new sensor node is connected, said processing unit configures a logic node for said new sensor node which is provided with physical node use information indicating that said sensor node is not in use and logical node use information indicating that said sensor node is provided as a logic node, and
    wherein, when a replacement request is received, said processing unit identifies said new sensor node as said replacing sensor node.

4. The sensor net server according to claim 1,
    wherein said processing unit, after having output the configuration information of said replaced sensor node, instructs said replaced sensor node and said replacing sensor node to output synchronized signals.

5. A sensor net server connected to a management computer, a client computer, and a plurality of sensor nodes, comprising:
    a processing unit for configuring a logic node for a connected one of said plurality of sensor nodes; and
    a storage unit for storing said logic node provided with physical node use information indicating whether or not said connected sensor node is in use and logic node use information indicating whether or not said sensor node is provided as said logic node,
    wherein, when a migration request of said sensor node is received, said processing unit specifies the original logic node of the sensor node to be migrated, and configures a destination logic node for said sensor node to be migrated, which is not said original logic node and is provided with physical node use information indicating that said sensor node is in use and logic node use information indicating that said logic node is being provided and the configuration information of the destination,
    wherein said sensor net server is connected to at least one terminal, and
    wherein, when a migration request of said sensor node is received, said processing unit notifies said computers of the configuration to set said logic node use information so as not to provide said sensor node as said logic node, and upon reception of a response to said notification from said computers, instructs said sensor node to be migrated to output that the migration is granted, and
    wherein the management computer transmits various requests to the sensor net server, and the client computer performs various processing based on environment information measured by the sensor nodes.

6. The sensor net server according to claim 5, wherein said processing unit configures the logic node use information provided with said original logic node so as to indicate that said sensor node is not provided as a logic node.

7. The sensor net server according to claim 5, wherein said processing unit transfers an event received from said sensor node to either of said management computer or client computer when said physical node use information provided in said logic node indicates that said sensor node is in use.

8. The sensor net server according to claim 5, wherein, when a request of moving back said migrated sensor node to the original location, said processing unit configures said logic node use information provided in said original logic node so as to indicate that said logic node is being provided, and configures said logic node use information provided in said destination logic node so as to indicate that said logic node is not in use.

* * * * *